US012640456B2

(12) United States Patent
Kim et al.

(10) Patent No.: US 12,640,456 B2
(45) Date of Patent: May 26, 2026

(54) CLAMPING APPARATUS FOR ANTENNA

(71) Applicant: KMW INC., Hwaseong-si (KR)

(72) Inventors: In Ho Kim, Yongin-si (KR); Dae Myung Park, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 565 days.

(21) Appl. No.: 18/104,269

(22) Filed: Jan. 31, 2023

(65) Prior Publication Data

US 2023/0178874 A1 Jun. 8, 2023

Related U.S. Application Data

(63) Continuation of application No. PCT/KR2021/009689, filed on Jul. 27, 2021.

(30) Foreign Application Priority Data

Jul. 31, 2020 (KR) ........................ 10-2020-0095953
Jul. 26, 2021 (KR) ........................ 10-2021-0098045

(51) Int. Cl.
*H01Q 1/12* (2006.01)
*H01Q 3/02* (2006.01)
*H01Q 3/08* (2006.01)

(52) U.S. Cl.
CPC ............. *H01Q 1/1228* (2013.01); *H01Q 3/02* (2013.01); *H01Q 3/08* (2013.01)

(58) Field of Classification Search
CPC .......... H01Q 1/1228; H01Q 3/02; H01Q 3/08; H01Q 1/125
See application file for complete search history.

(56) References Cited

U.S. PATENT DOCUMENTS 10,033,096 B2 7/2018 Hirabe
2018/0048062 A1* 2/2018 Jo ........................ H01Q 1/1257
2018/0083356 A1* 3/2018 Ligander ................ F16M 13/02
2022/0037758 A1* 2/2022 Kim ........................ F16M 13/02
2022/0123455 A1* 4/2022 Kang .................. H01Q 1/1264

(Continued)

FOREIGN PATENT DOCUMENTS

JP 61-18605 U 2/1986
JP 05-090819 A 4/1993

(Continued)

OTHER PUBLICATIONS

Extended European Search Report mailed Oct. 4, 2024 from the European Patent Office for European Application No. 21849773.3.

(Continued)

*Primary Examiner* — Hai V Tran

(57) ABSTRACT

A clamping apparatus for an antenna includes: a tilting bracket connected to the antenna to support the antenna; a base bracket provided on a support pole and protruding toward the antenna; an integrating housing having the tilting bracket coupled thereto so as to rotate in the vertical direction and coupled to the base bracket so as to rotate in the horizontal direction; a tilt driving unit for rotating the tilting bracket in the vertical direction; and a rotation driving unit for rotating the integrating housing in the horizontal direction. The tilt driving unit and rotation driving unit are disposed inside the integrating housing.

19 Claims, 28 Drawing Sheets

(56) References Cited

U.S. PATENT DOCUMENTS

| | | | | |
|---|---|---|---|---|
| 2022/0140466 A1* | 5/2022 | Kim | ........................ | F16B 9/054 343/702 |
| 2022/0190473 A1* | 6/2022 | Kim | ..................... | H01Q 1/1264 |
| 2022/0238982 A1* | 7/2022 | Kim | ..................... | H01Q 1/1242 |

FOREIGN PATENT DOCUMENTS

| | | | |
|---|---|---|---|
| JP | 05-218720 | A | 8/1993 |
| JP | H05-218720 | A | 8/1993 |
| JP | H05-248709 | A | 9/1993 |
| JP | H05-090819 | U | 12/1993 |
| JP | 2013-250558 | A | 12/2013 |
| KR | 20-0406803 | Y1 | 1/2006 |
| KR | 10-1209387 | B1 | 12/2012 |
| KR | 10-1793834 | A | 11/2017 |
| KR | 10-2095871 | B1 | 4/2020 |

OTHER PUBLICATIONS

Non-final Office Action issued on Feb. 9, 2024 for the Japanese Application No. 2023-506085.

International Search Report mailed Nov. 2, 2021 for International Application No. PCT/KR2021/009689 and its English translation.

Non-final Office Action mailed Aug. 8, 2022 from the Korean Intellectual Property Office for Korean Application No. 10-2021-0098045.

* cited by examiner

CLAMPING APPARATUS FOR ANTENNA

CROSS-REFERENCE TO RELATED APPLICATIONS

This application is a continuation application of International Application No. PCT/KR2021/009689, filed Jul. 27, 2021, which claims the benefit of Korean Patent Application Nos. 10-2020-0095953, filed Jul. 31, 2020; and 10-2021-0098045, filed Jul. 26, 2021, in the Korean Intellectual Property Office, the disclosures of which are incorporated herein in their entirety by reference.

TECHNICAL FIELD

The present disclosure relates to a clamping apparatus for an antenna, and more specifically, to a clamping apparatus for an antenna capable of efficiently arranging an antenna device in a dense installation space and easily adjusting a direction of the antenna device.

BACKGROUND ART

In general, a wireless communication technology, for example, a multiple-input and multiple-output (MIMO) technology is a technology of dramatically increasing a data transmission capacity using a plurality of antennas and a spatial multiplexing technique in which a transmitter transmits different data through each transmission antenna and a receiver separates transmission data through appropriate signal processing.

Therefore, as the number of transmission/reception antennas is simultaneously increased, a channel capacity may increase and more data may be transmitted. For example, when the number of antennas is increased to 10, about 10 times the channel capacity is secured using the same frequency band as compared to a current single antenna system.

8 antennas are used in 4G LTE Advanced, products equipped with 64 or 128 antennas are currently being developed in a pre-5G stage, and base station equipment with a much larger number of antennas is expected to be used in 5G, which is called a massive MIMO technology. The current cell operation is 2-dimension, but since 3D-beamforming becomes possible when the massive MIMO technology is introduced, this is also called a full dimension-MIMO (FD-MIMO).

In the massive MIMO technology, as the number of antennas increases, the number of transmitters and filters also increases accordingly. Nevertheless, due to the lease costs or space constraints of installation positions, small, lightweight, and low-cost radio frequency (RF) components (antenna/filter/power amplifier/transceiver, etc.) are actually manufactured, and the massive MIMO technology requires a high output to expand a coverage, and power consumption and the amount of heating caused by the high output act as negative factors in reducing a weight and a size.

In particular, when a MIMO antenna in which modules composed of RF elements and digital elements are coupled in a stacked structure is installed in a limited space, a compact and miniaturized design of a plurality of layers constituting the MIMO antenna is required to maximize the ease of installation and the spatial utilization, and there is a strong demand for the free direction control of an antenna device installed on one support pole.

In response to the demand, Korean Patent No. 10-2095871 (registered on Apr. 2, 2020) (hereinafter referred to as "the related art") discloses "CLAMPING APPARATUS FOR ANTENNA" including a tilting unit for rotating an antenna device in a vertical direction and a rotation unit for rotating the antenna device in a horizontal direction.

However, in the related art, since the tilting unit and the rotation unit are formed as separate structures, there is a problem in that the structure is complicated and the size is large.

In addition, in the related art, when the antenna device is in a state of being installed on the support pole, the antenna device is disposed to excessively protrude in a radial direction of the support pole, and thus there is also a problem in that the installation positions and installation directions of the antennas may be changed by wind and a sense of disgust may also be given by the excessively protruding installation of the antenna device.

DISCLOSURE

Technical Problem

The present disclosure is directed to providing a clamping apparatus for an antenna having a simpler structure and a smaller size by integrating components for rotating an antenna in a vertical direction and a horizontal direction into one.

The present disclosure is directed to providing a clamping apparatus for an antenna in which the installation position and installation direction of the antenna are not easily changed by wind and a sense of disgust caused by the excessive protruding installation of the antenna can be reduced.

The object of the present disclosure is not limited to the above-described objects, and other objects that are not mentioned will be able to be clearly understood by those skilled in the art from the following description.

Technical Solution

In order to achieve the objects, a clamping apparatus for an antenna according to the present disclosure is composed of a tilting bracket, a base bracket, an integrating housing, a tilting driving unit, and a rotation driving unit. The tilting bracket may be connected to an antenna and configured to support the antenna. The base bracket may be installed on a support pole. The base bracket may be disposed to protrude toward the antenna. The tilting bracket may be rotatably coupled to the integrating housing in a vertical direction. The integrating housing may be coupled to the base bracket to be rotated in a horizontal direction. The tilting driving unit may rotate the tilting bracket in the vertical direction. The rotation driving unit may rotate the integrating housing in the horizontal direction. The tilting driving unit and the rotation driving unit may be disposed in the integrating housing.

The tilting driving unit may be composed of a tilting motor, a tilting reducer, a tilting worm shaft, and a tilting rotation shaft. An input shaft of the tilting reducer may be coupled to a rotation shaft of the tilting motor. The tilting worm shaft may be coupled to an output shaft of the tilting reducer. A tilting worm gear may be provided on an outer circumferential surface of the tilting worm shaft. A tilting worm wheel gear engaged with the tilting worm gear may be provided on an outer circumferential surface of the tilting rotation shaft. The tilting rotation shaft may be disposed horizontally and coupled to the tilting bracket.

The rotation shaft of the tilting motor may be disposed horizontally. The tilting worm shaft may be vertically disposed.

The tilting bracket may be composed of a tilting bracket body and a tilting bracket wing. The tilting bracket body may be coupled to a rear surface of the antenna. The tilting bracket wing may be formed to protrude rearward from each of both sides of the tilting bracket body. The tilting bracket wings may be coupled to the tilting rotation shaft through tilting holes formed in both sides of the integrating housing.

The rotation driving unit may be composed of a rotation motor, a rotation reducer, a rotation worm shaft, and a rotation shaft. An input shaft of the rotation reducer may be coupled to a rotation shaft of the rotation motor. The rotation worm shaft may be coupled to an output shaft of the rotation reducer. A rotation worm gear may be provided on an outer circumferential surface of the rotation worm shaft. A rotation worm wheel gear engaged with the rotation worm gear may be provided on an outer circumferential surface of the rotation shaft. The rotation shaft may be vertically disposed and coupled to the integrating housing.

A rotation shaft of the rotation motor may be disposed vertically. The rotation worm shaft may be disposed horizontally.

An installation bracket may be further installed on the support pole. An upper surface of the installation bracket may be formed horizontally. The base bracket may be coupled to the installation bracket and disposed on the upper surface of the installation bracket.

The rotation driving unit may further include a rotation fixing shaft. The rotation shaft may be rotatably installed on an outer circumference of the rotation fixing shaft. The rotation fixing shaft may be vertically disposed. A center protrusion may be formed to protrude upward from a center of an upper surface of the base bracket. The center protrusion may be inserted into a rotation hole formed in a lower surface of the integrating housing and coupled to the rotation fixing shaft.

The center protrusion may be installed on the base bracket to be rotated in the horizontal direction. The center protrusion may be disposed to protrude upward from a center of an upper surface of the base bracket. The center protrusion may be inserted into a rotation hole formed in a lower surface of the integrating housing and coupled to the rotation shaft.

The tilting driving unit may be disposed above the rotation driving unit.

The integrating housing may be disposed on an upper surface of the base bracket.

A plurality of guide rollers may be rotatably installed on the base bracket. The plurality of guide rollers may come into contact with the lower surface of the integrating housing and may be configured to guide a horizontal rotation of the integrating housing.

A plurality of roller insertion holes may be formed in the base bracket. The plurality of guide rollers may be respectively inserted into the plurality of roller insertion holes. A plurality of roller covers may be coupled to the base bracket. A roller protrusion hole may be formed in each of the plurality of roller covers. Bodies of the plurality of guide rollers respectively inserted into the plurality of roller insertion holes may protrude upward through the respective roller protrusion holes.

A hole through which a direction control cable configured to control the tilting driving unit and the rotation driving unit passes may be formed in the installation bracket and the center protrusion.

A connector may be provided on one end of a direction control cable configured to control the tilting driving unit and the rotation driving unit. A socket to which the connector is connected may be provided on the outer circumferential surface of the integrating housing.

The tilting driving unit may be disposed in front of the rotation driving unit.

A rear portion of the integrating housing may be disposed on an upper surface of the base bracket. A front portion of the integrating housing may be disposed to protrude forward more than the base bracket.

A plurality of balls may be rotatably installed on the lower surface of the integrating housing. The plurality of balls may come into contact with the upper surface of the base bracket and may be configured to guide a horizontal rotation of the integrating housing.

A ring-shaped ball insertion groove may be formed in a lower surface of the integrating housing. The plurality of balls may be inserted into the ring-shaped ball insertion groove. A ball cover may be coupled to the lower surface of the integrating housing. At least one ball protrusion hole may be formed in the ball cover. The plurality of balls inserted into the ball insertion groove may protrude downward from the at least one ball protrusion hole.

An arc-shaped guide hole extending vertically may be formed in the base bracket. A ball guider may be disposed under the base bracket. The ball guider may be coupled to the lower surface of the integrating housing through the guide hole. A plurality of rotatable balls may be disposed to protrude from the upper surface of the ball guider. The plurality of balls may come into contact with a lower surface of the base bracket.

The ball guider may be disposed to be inserted into the guide hole. A step may be formed in the guide hole. The plurality of balls disposed on the upper surface of the ball guider may come into contact with a lower surface of the step.

The tilting bracket may be composed of a first tilting bracket and a second tilting bracket. The first tilting bracket may be connected to a first antenna and configured to support the first antenna. A first tilting bracket may be disposed on one side of the integrating housing. A second tilting bracket may be connected to a second antenna and configured to support the second antenna. The second tilting bracket may be disposed on the other side of the integrating housing.

The first tilting bracket may be composed of a first tilting bracket body and a first tilting bracket wing. The first tilting bracket body may be coupled to a rear surface of the first antenna. The first tilting bracket wing may be formed to protrude forward from one side of the first tilting bracket body. The first tilting bracket wing may be coupled to the tilting rotation shaft through a first tilting coupling member formed on one side of the integrating housing. The second tilting bracket may be composed of a second tilting bracket body and a second tilting bracket wing. The second tilting bracket body may be coupled to a rear surface of the second antenna. The second tilting bracket wing may be formed to protrude forward from one side of the second tilting bracket body. The second tilting bracket wing may be coupled to the tilting rotation shaft through a second tilting coupling member formed on the other side of the integrating housing.

A rotation fixing shaft may be further configured on the rotation driving unit. The rotation shaft may be rotatably installed on an outer circumference of the rotation fixing shaft. The rotation fixing shaft may be vertically disposed. A center protrusion may be formed to protrude upward from a center of an upper surface of the base bracket. The rotation fixing shaft may be disposed to protrude through a rotation hole formed in the lower surface of the integrating housing. The center protrusion may be coupled to the rotation fixing shaft disposed to protrude through the rotation hole.

The center protrusion may be installed on the base bracket to be rotated in the horizontal direction. The center protrusion may be formed at the center of an upper surface of the base bracket. The rotation shaft may be disposed to protrude through a rotation hole formed in the lower surface of the integrating housing. The center protrusion may be coupled to the rotation shaft disposed to protrude through the rotation hole.

An arc-shaped guide groove may be formed in an upper surface of the base bracket. A ball may be rotatably installed on the lower surface of the integrating housing. The ball may be inserted into the guide groove and configured to guide a horizontal rotation of the integrating housing.

The detailed matters in other embodiments are included in the detailed description and the drawings.

Advantageous Effects

In the clamping apparatus for an antenna according to the present disclosure, the tilting driving unit configured to rotate the antenna in the vertical direction and the rotation driving unit configured to rotate the antenna in the horizontal direction are disposed in the integrating housing. In other words, since the tilting driving unit and the rotation driving unit are installed together in one integrating housing, it is possible to simplify the structure of the clamping apparatus and reduce the size thereof.

In addition, in the clamping apparatus for an antenna according to the present disclosure, when the antenna is installed on the support pole through the clamping apparatus for an antenna, the antenna can be installed close to the support pole, and thus the installation position and installation direction of the antenna are not easily changed by wind and the sense of disgust caused by the excessive protruding installation of the antenna can be reduced.

Meanwhile, the clamping apparatus for an antenna according to the present disclosure can also be used for installing not only the above-described MIMO antenna, but also lighting fixtures such as light emitting diode (LED) lighting devices and high-output sports lightings, and the effects of the present disclosure are not limited to the above-described effects, and other effects that are not mentioned will be clearly understood by those skilled in the art from the appended claims.

MODE FOR INVENTION

Hereinafter, a clamping apparatus for an antenna according to embodiments of the present disclosure will be described with reference to the accompanying drawings.

Figure 1:
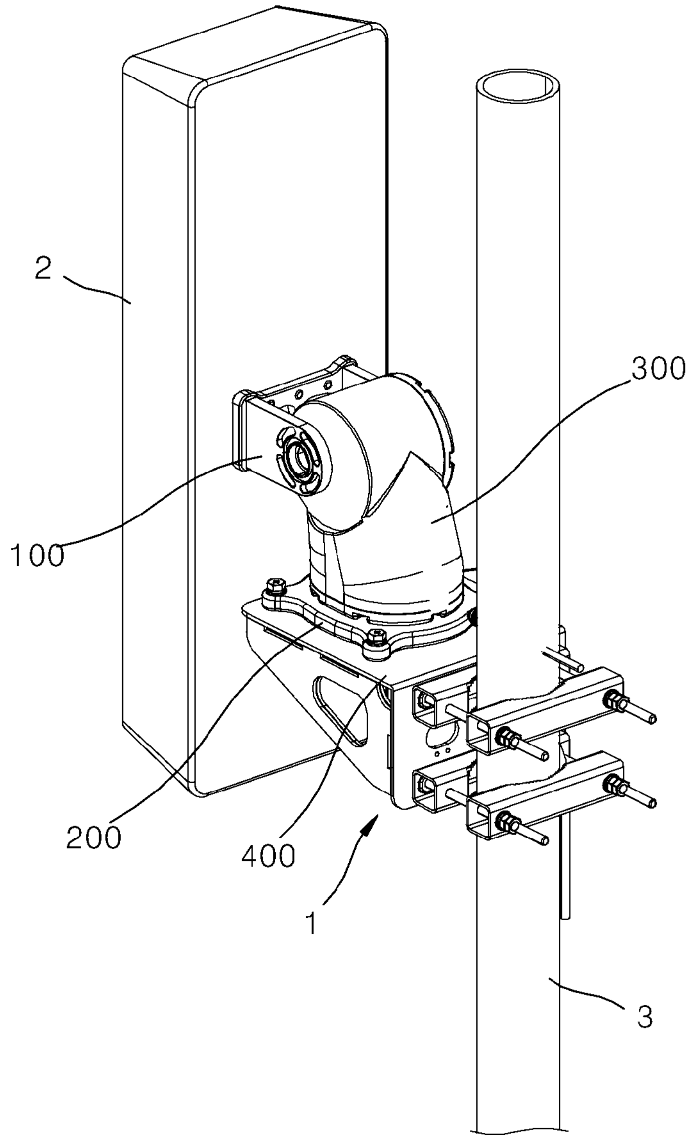
FIG. 1 is a rear perspective view showing a state in which an antenna is installed on a support pole through a clamping apparatus for an antenna according to a first embodiment of the present disclosure.
Figure 2:
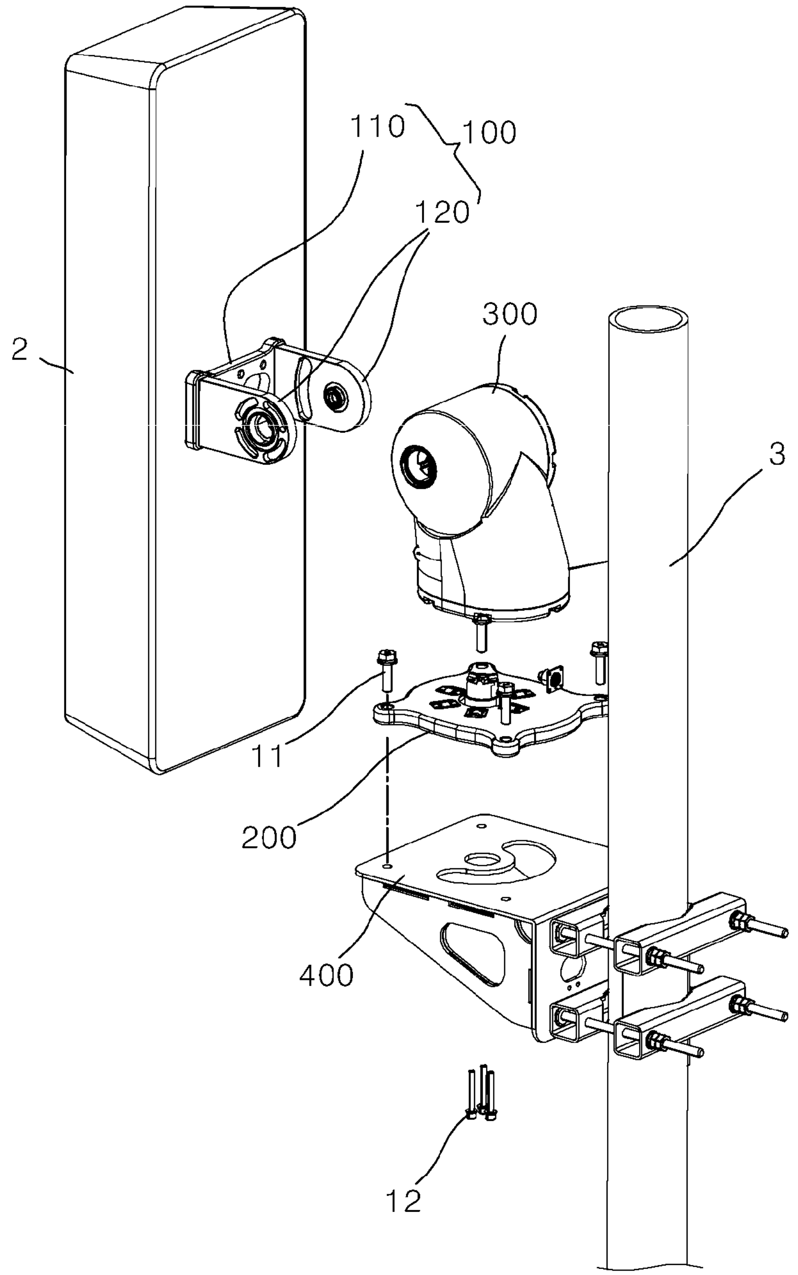
FIG. 2 is an exploded perspective view of FIG. 1.
Figure 3:
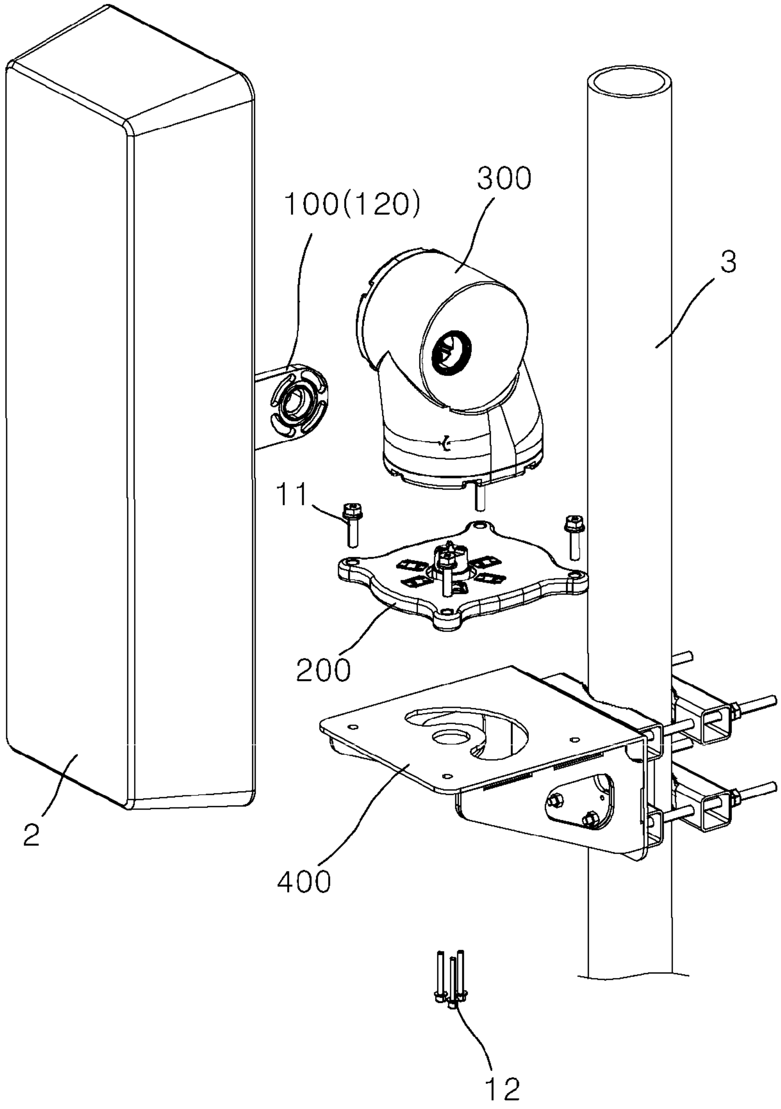
FIG. 3 is an exploded perspective view of FIG. 2 viewed from the front.
Figure 4:
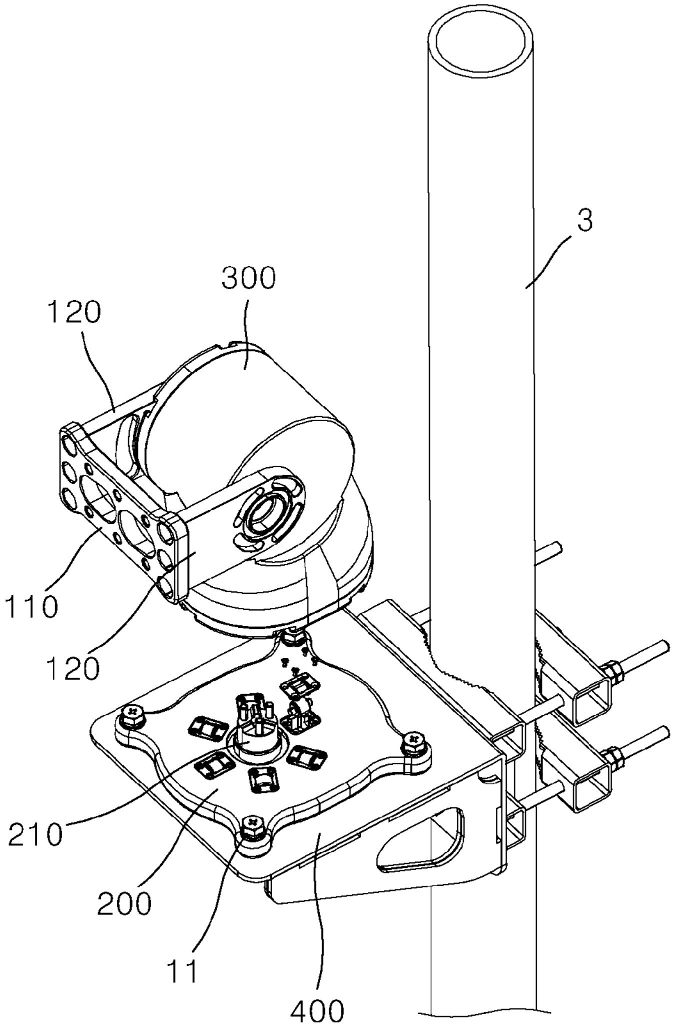
FIG. 4 is a front perspective view showing a partially exploded state of the clamping apparatus for an antenna according to the first embodiment of the present disclosure.
Figure 5:
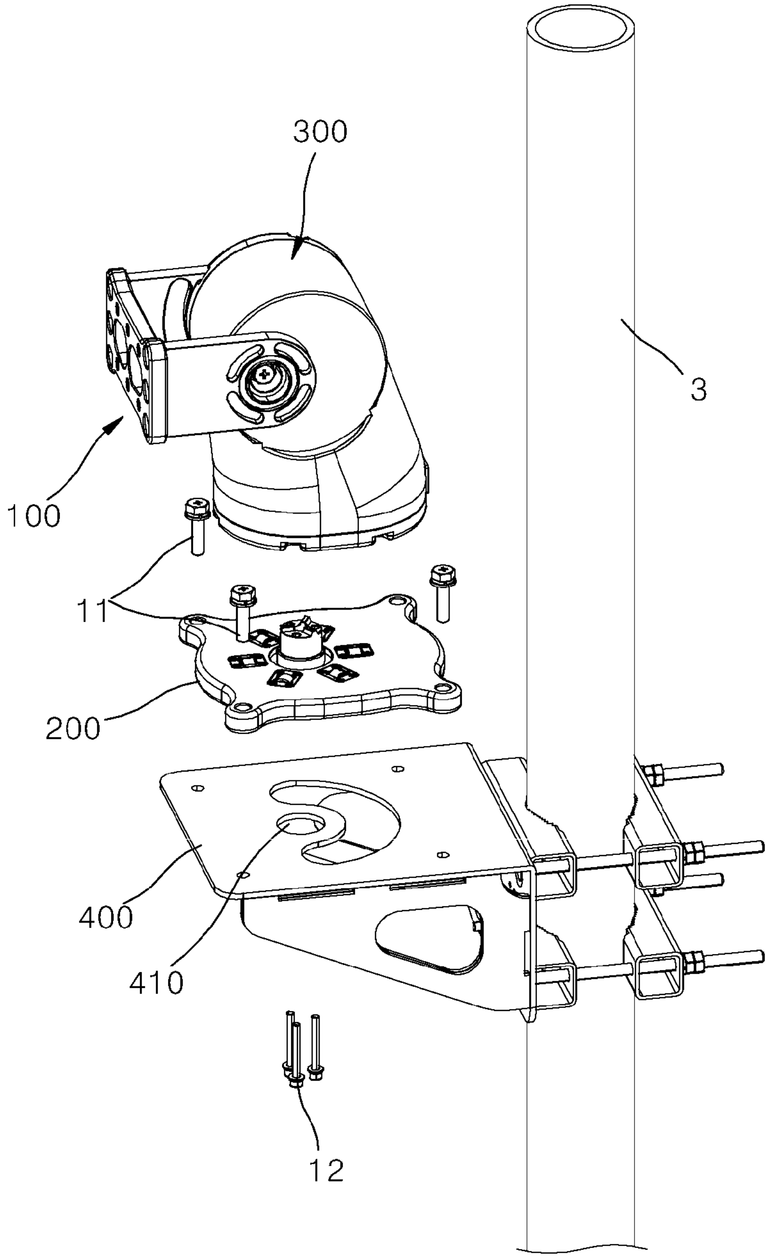
FIG. 5 is a detailed exploded view of FIG. 4.
Figure 6:
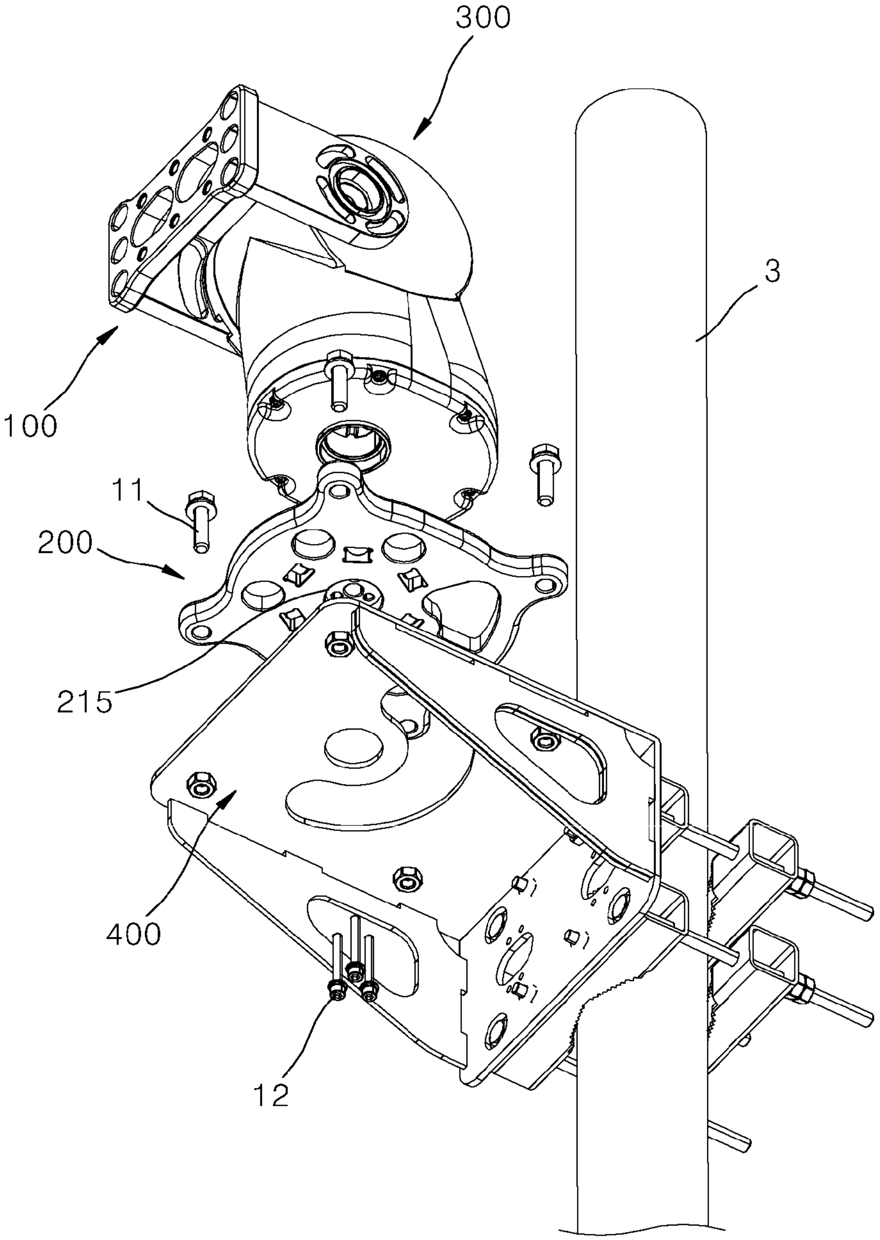
FIG. 6 is a bottom perspective view of FIG. 5.

FIG. 1 is a rear perspective view showing a state in which an antenna is installed on a support pole through a clamping apparatus for an antenna according to a first embodiment of the present disclosure, FIG. 2 is an exploded perspective view of FIG. 1, FIG. 3 is an exploded perspective view of FIG. 2 viewed from the front, FIG. 4 is a front perspective view showing a partially exploded state of the clamping apparatus for an antenna according to the first embodiment of the present disclosure, FIG. 5 is a detailed exploded view of FIG. 4, and FIG. 6 is a bottom perspective view of FIG. 5.

Hereinafter, in an embodiment of FIGS. 1 to 6, an example in which the clamping apparatus according to the present disclosure is applied to an antenna is described, but the clamping apparatus according to the present disclosure may also be applied to a case in which not only an antenna, but also lighting devices such as LED lighting devices and high-out sports lightings (not shown) are installed on a support pole.

Referring to FIGS. 1 to 6, a clamping apparatus 1 for an antenna according to an embodiment of the present disclosure may be an apparatus for installing an antenna 2 on a support pole 3. When the antenna 2 is in a state of being installed on the support pole 3 through the clamping apparatus 1 for an antenna, the clamping apparatus 1 for an antenna may rotate the antenna 2 in a vertical direction and a horizontal direction and also adjust a direction of the antenna 2.

The antenna 2 may include a substantially hexahedral antenna housing, and a printed circuit board on which at least one antenna element and at least one radio unit (RU) are mounted are mounted may be provided inside the antenna housing. Here, the antenna element may transmit and receive a radio signal, and the RU may process the radio signal. In addition, the antenna housing may be made of a heat-dissipating material such as aluminum, and heat-dissipation ribs for increasing a contact area with ambient air may be formed on an outer surface of the antenna housing.

The support pole 3 may be formed as an RC bar. Of course, the support pole 3 is not limited to the RC bar and may include all pillar-shaped members on which the antenna 2 is installed on an outer circumferential surface thereof through the clamping apparatus 1 for an antenna.

The clamping apparatus 1 for an antenna may include a tilting bracket 100, a base bracket 200, and an integrating rotation driving unit 300.

The tilting bracket 100 may be installed on the antenna 2. The tilting bracket 100 may be installed on a rear surface of the antenna 2. The tilting bracket 100 may be connected to the antenna 2 to support the antenna 2. The tilting bracket 100 may be disposed to protrude toward the support pole 3 in a state of being installed on the antenna 2.

The tilting bracket 100 may include a tilting bracket body 110 and a tilting bracket wing 120.

The tilting bracket body 110 may be coupled to the rear surface of the antenna 2. The tilting bracket body 110 may be formed in a rectangular plate shape in which a front surface thereof comes into contact with the rear surface of the antenna 2.

The tilting bracket body 110 may be coupled to the rear surface of the antenna 2 through a plurality of bolts and a plurality of nuts. In this case, it is preferable that bolt holes into which the bolts are fastened are formed on each of the tilting bracket body 110 and the rear surface of the antenna 2.

Of course, a method in which the tilting bracket body 110 is coupled to the rear surface of the antenna 2 may be coupled by various known coupling methods such as welding.

The tilting bracket wings 120 may be formed to protrude rearward from each of both sides of the tilting bracket body 110. The tilting bracket wing 120 may be formed in a rectangular plate shape and formed to have a convex rounded-shaped rear end. The tilting bracket wings 120 may be connected to each of both sides of the integrating rotation driving unit 300 and rotated in a vertical direction by a driving force of the integrating rotation driving unit 300. Holes extending in a horizontal direction may be formed in the rear ends of the tilting bracket wings 120 on both sides. The holes formed to pass through the rear ends of the tilting bracket wings 120 on both sides in the horizontal direction may be holes for coupling with the integrating rotation driving unit 300.

The base bracket 200 may be installed on the support pole 3. However, in the embodiment, the clamping apparatus 1 for an antenna may further include an installation bracket 400. The installation bracket 400 may be detachably installed on an outer circumferential surface of the support pole 3 through a clamp. The installation bracket 400 may be disposed to protrude in a radial direction of the support pole 3 in the state of being installed on the support pole 3 The installation bracket 400 may be disposed to protrude toward the antenna 2 in the state of being installed on the support pole 3 The installation bracket 400 may be disposed to protrude in a direction opposite to the protruding direction of the tilting bracket 100. An upper surface of the installation bracket 400 may be formed horizontally.

The installation bracket 400 may include a horizontal upper surface portion, a vertical rear surface portion, and side surface portions connecting both sides of the upper surface portion and both sides of the rear surface portion. Here, the rear surface portion may be disposed opposite to a circumferential surface of the support pole 3 and detachably fastened to the support pole 3 through the clamp.

The base bracket 200 may be directly installed on the support pole 3. However, as in the embodiment, when the installation bracket 400 is further installed on the support pole 3, the base bracket 200 may be coupled to the installation bracket 400 and disposed on the upper surface of the installation bracket 400.

The base bracket 200 may be formed as a substantially rectangular plate body. Each of four corners of the base bracket 200 may be fastened to the installation bracket 400 through bolts 11 and nuts. Bolt holes to which the bolts 11 are fastened may be formed in each of the four corners of the base bracket 200 and the installation bracket 400.

A center protrusion 210 may be formed to protrude upward from a center of the upper surface of the base bracket 200. The integrating rotation driving unit 300 may be rotatably coupled to the center protrusion 210 in the horizontal direction.

An accommodating groove 215 may be formed at the center of a lower surface of the base bracket 200 that is opposite to the center protrusion 210. The accommodating groove 215 may accommodate heads of a plurality of bolts 12 to be described below so that the base bracket 200 may be easily seated on the upper surface of the installation bracket 400, and thus the base bracket 200 may be easily and firmly coupled to the installation bracket 400.

The integrating rotation driving unit 300 may be substantially one device for adjusting the vertical direction and horizontal directions of the antenna 2. In other words, in the clamping apparatus 1 for an antenna according to the embodiment of the present disclosure, the driving device for adjusting the vertical direction and horizontal direction of the antenna 2 may be installed in one integrating housing 310.

The integrating rotation driving unit 300 may connect between the tilting bracket 100 and the base bracket 200.

Since the tilting bracket 100 is rotatably coupled to the integrating rotation driving unit 300 in the vertical direction, the integrating rotation driving unit 300 may rotate the tilting bracket 100 in the vertical direction. In addition, since the integrating rotation driving unit 300 is rotatably coupled to the base bracket 200 in the horizontal direction, the integrating rotation driving unit 300 may be rotated in the horizontal direction with respect to the base bracket 200.

When the integrating rotation driving unit 300 rotates the tilting bracket 100 in the vertical direction, the vertical direction of the antenna 2 may be adjusted. In addition, when the integrating rotation driving unit 300 is rotated in the horizontal direction, the horizontal direction of the antenna 2 may be adjusted.

Hereinafter, the vertical rotation means that the antenna 2 is rotated about a horizontal axis and may have the same meaning as tilting. In addition, the horizontal rotation means that the antenna 2 is rotated in a circumferential direction of the support pole 3 and may have the same meaning as rotation.

The integrating rotation driving unit 300 may include the integrating housing 310 (see FIGS. 8 and 9) forming the appearance of the integrating rotation driving unit 300. Since the tilting bracket 100 may be coupled to the integrating housing 310 to be rotated in the vertical direction, the tilting bracket 100 may be coupled to the integrating rotation driving unit 300 to be rotated in the vertical direction. In addition, since the integrating housing 310 is coupled to the base bracket 200 to be rotated in the horizontal direction, the integrating rotation driving unit 300 may be coupled to the base bracket 200 to be rotated in the horizontal direction.

Figure 7:
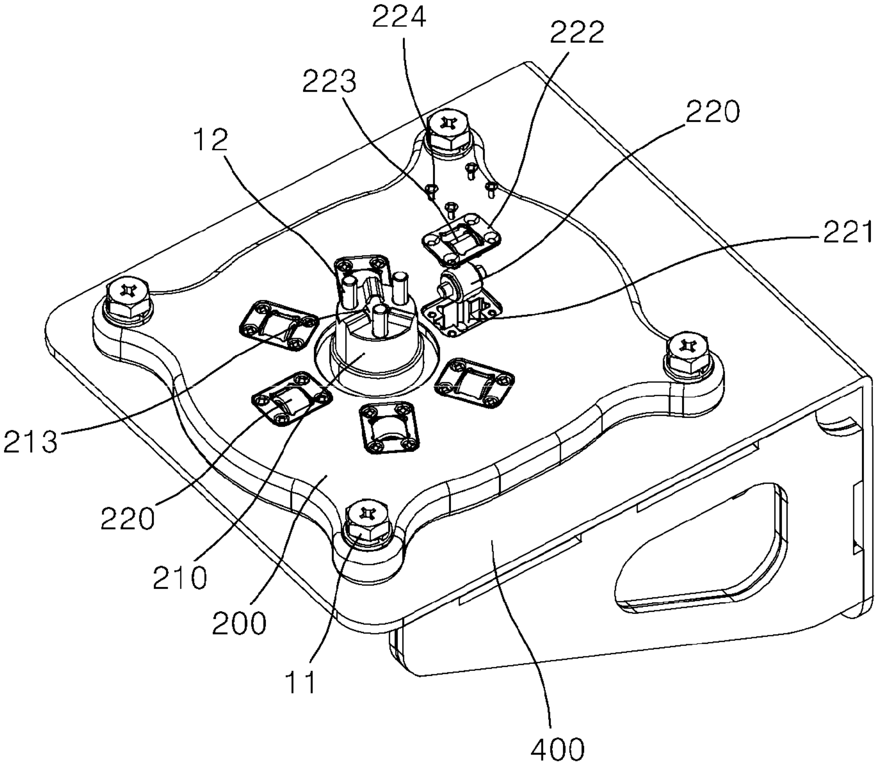
FIG. 7 is an enlarged view of a portion of FIG. 4.

FIG. 7 is an enlarged view of a portion of FIG. 4.

Referring to FIG. 7, a plurality of guide rollers 220 may be rotatably installed on the base bracket 200. The plurality of guide rollers 220 may come into contact with a lower surface of the integrating housing 310 to guide the horizontal rotation of the integrating housing 310.

The plurality of guide rollers 220 may be disposed outside the center protrusion 210 in a radial direction and disposed to be spaced apart from each other in a circumferential direction of the center protrusion 210.

In the embodiment, six guide rollers 220 are installed on the base bracket 200, but the number of the plurality of guide rollers 220 is not limited to six, and two or more guide rollers 220 may be used.

A plurality of roller insertion holes 221 may be formed in the base bracket 200. The plurality of guide rollers 220 may be respectively inserted into the plurality of roller insertion holes 221.

The plurality of guide rollers 220 may include a cylindrical body and shafts protruding from each center of both end surfaces of the body.

The plurality of roller insertion holes 221 may be formed in a shape into which all of the body and the shafts of the guide roller 220 may be inserted.

The plurality of roller insertion holes 221 may be formed to pass through the base bracket 200 in the vertical direction and may have an upper side having a greater opening than a lower side. Therefore, the plurality of guide rollers 220 may be rotatably supported in the roller insertion holes 221, respectively.

A plurality of roller covers 222 may be coupled to the base bracket 200. Each of the plurality of roller covers 222 may be coupled to the upper side of the roller insertion hole 221, thereby preventing the guide roller 220 from being separated from the roller insertion hole 221.

A roller protrusion hole 223 may be formed in each of the plurality of roller covers 222. The bodies of the plurality of guide rollers 220 respectively inserted into the plurality of roller insertion holes 221 may protrude upward through each roller protrusion hole 223. A portion of the body of the guide roller 220 protruding upward through the roller protrusion hole 223 may come into contact with the lower surface of the integrating housing 310 to guide the rotation of the integrating housing 310.

The plurality of roller covers 222 may be formed in a rectangular plate shape. The roller protrusion hole 223 may be formed in a rectangular shape at the center of the roller cover 222. Screw holes may be formed in four corners of each of the plurality of roller covers 222, and screws 224 may be respectively inserted into the screw holes to fasten each of the roller covers 222 to the base bracket 200.

Figure 8:
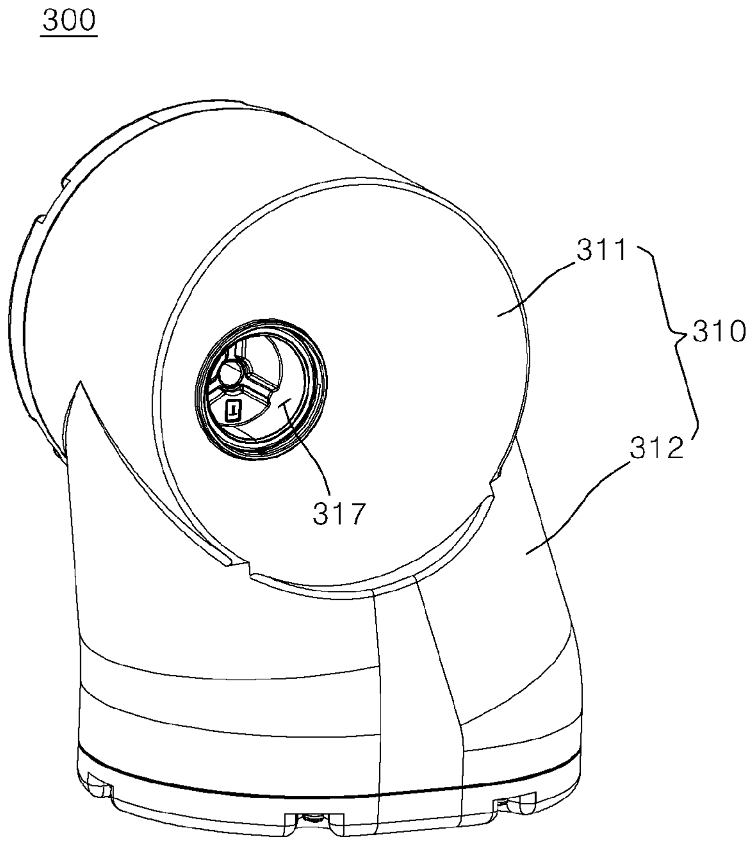
FIG. 8 is a perspective view showing an integrating rotation driving unit shown in FIGS. 1 to 7.

FIG. 8 is a perspective view showing an integrating rotation driving unit shown in FIGS. 1 to 7, and FIG. 9 is a bottom perspective view of FIG. 8.

Figure 9:
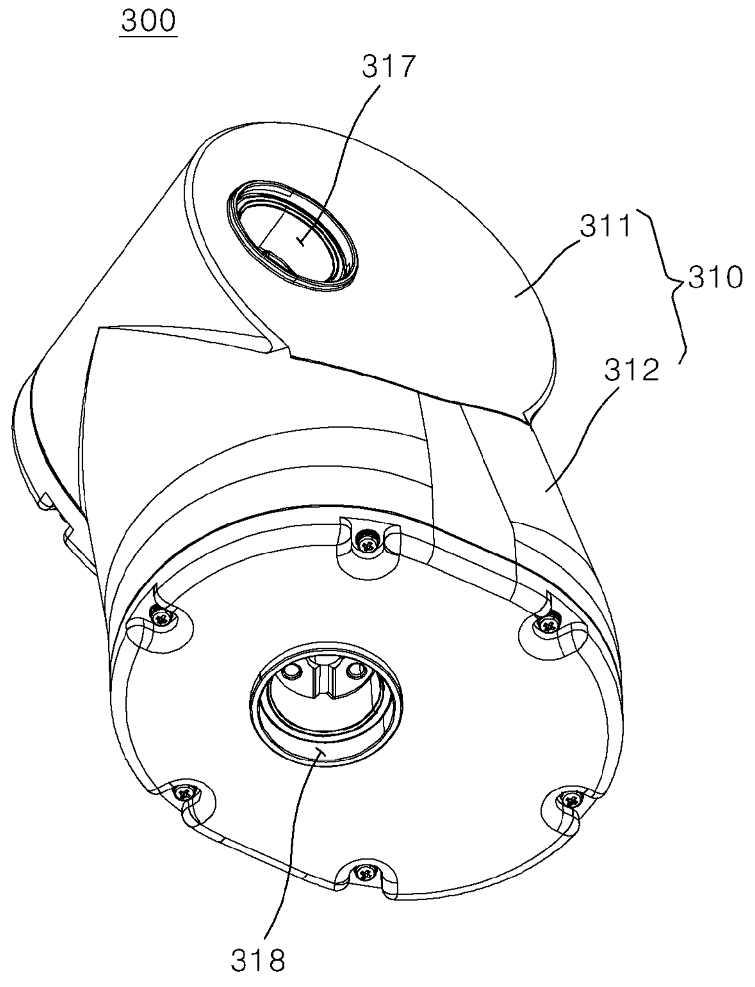
FIG. 9 is a bottom perspective view of FIG. 8.

Referring to FIGS. 8 and 9, the integrating rotation driving unit 300 may include then integrating housing 310, and the integrating housing 310 may include an upper portion 311 and a lower portion 312.

The upper portion 311 of the integrating housing 310 may be formed in a long cylindrical shape in a left-right direction. In addition, the lower portion 312 of the integrating housing 310 may be formed in a vertically long cylindrical shape and may have a shape in which a front portion is concave and a rear portion is convex.

Tilting holes 317 may be formed in both sides of the integrating housing 310. The tilting holes 317 may be formed in both sides of the upper portion 311 of the integrating housing 310. The tilting hole 317 may be a hole for connection between the tilting bracket 100 and the tilting driving unit 320 (see FIGS. 10 to 12).

Figure 13:
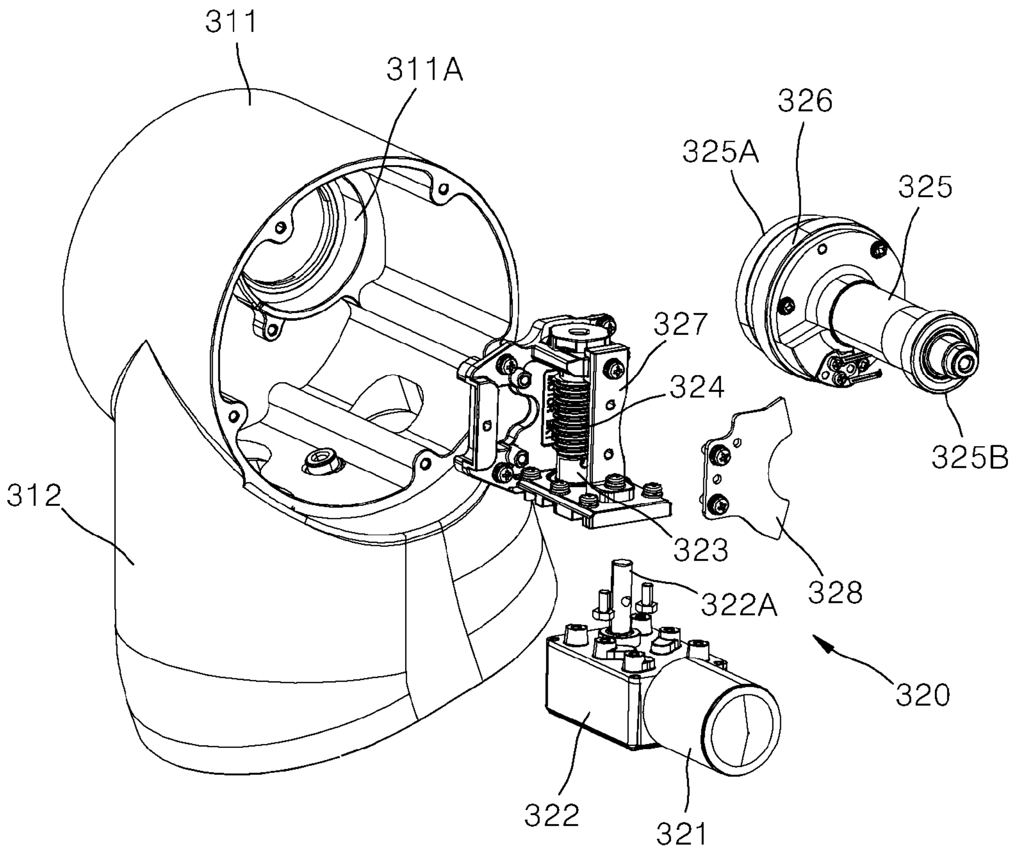
FIG. 13 is an exploded perspective view of a tilt driving unit shown in FIGS. 10 to 12.
Figure 14:
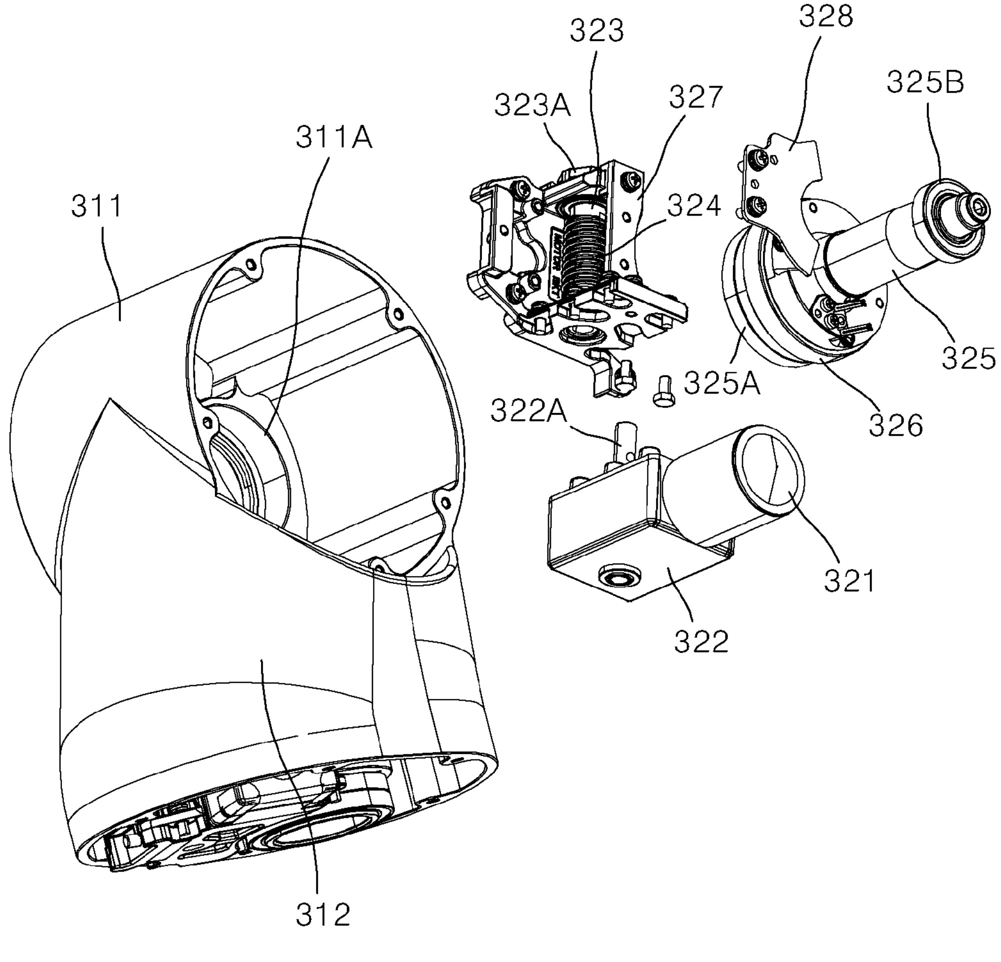
FIG. 14 is an exploded perspective view of FIG. 13 viewed from the bottom.

In other words, after the tilting hole 317 is aligned with a hole formed in a rear end of the tilting bracket wing 120, the bolt may be inserted into the hole formed in the rear end of the tilting bracket wing 120 and the tilting hole 317 and coupled to an end of a tilting rotation shaft 325 of the tilting driving unit 320 (see FIGS. 13 and 14). Insertion portions inserted into the tilting holes 317 on both sides may be formed around the hole formed in the rear ends of the tilting bracket wings 120 on both sides, a plurality of latching protrusions may be formed on any one of end surfaces of the insertion portions on both sides and both ends surfaces of the tilting rotation shaft 325, and a plurality of latching grooves into which the plurality of latching protrusions are respectively inserted may be formed in the other. Since the plurality of latching protrusions and the plurality of latching grooves are latched, a rotation force of the tilting rotation shaft 325 may be stably transmitted to the tilting bracket 100, thereby preventing the release of the bolt.

In addition, a rotation hole 318 may be formed in the lower surface of the integrating housing 310. The rotation hole 318 may be formed at the center of the lower surface of the integrating housing 310. The rotation hole 318 may be a hole for connection between the base bracket 200 and the rotation driving unit 330 (see FIGS. 10 to 12).

Figure 15:
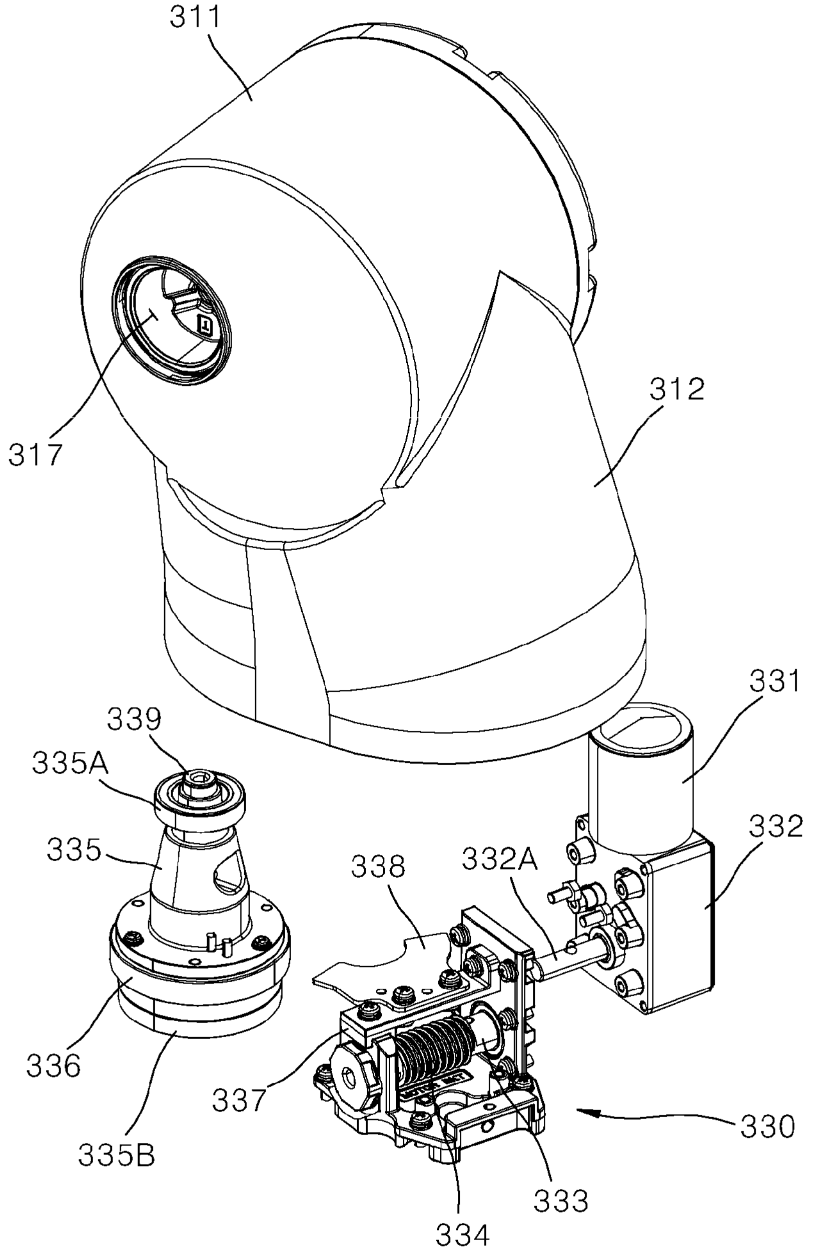
FIG. 15 is an exploded perspective view of the rotation driving unit shown in FIGS. 10 to 12.
Figure 16:
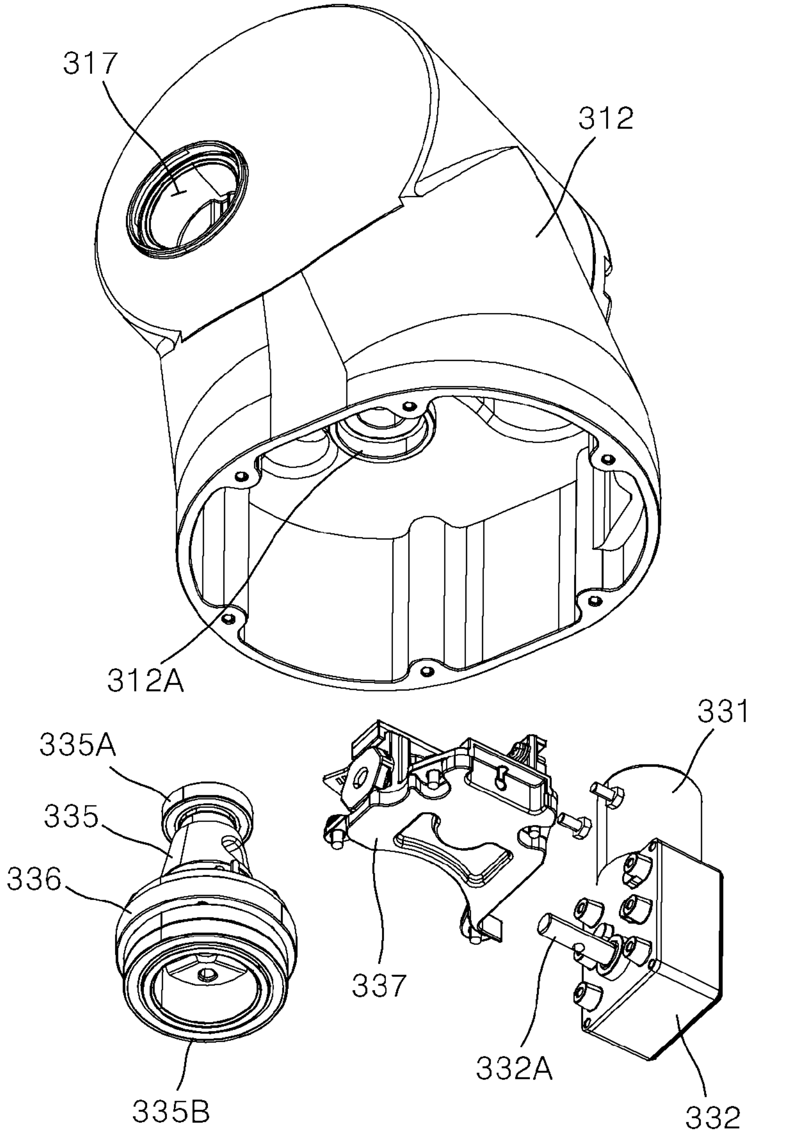
FIG. 16 is an exploded perspective view of FIG. 15 viewed from the bottom.

In other words, after the center protrusion 210 formed at the center of the base bracket 200 is inserted into the rotation hole 318, the plurality of bolts 12 may be inserted into the plurality of holes formed to vertically pass through the center protrusion 210 and coupled to a lower end of a rotation fixing shaft 339 (see FIG. 15). The plurality of latching protrusions may be formed on any one of the upper end surface of the center protrusion 210 and the lower end surface of the rotation fixing shaft 339, and the plurality of latching grooves into which the plurality of latching protrusions are respectively inserted may be formed on the other. Since the plurality of latching protrusions and the plurality of latching grooves are latched, the integrating housing 310 may be stably rotated by the rotation force of a rotation shaft 335, thereby preventing the release of the plurality of bolts 12.

Figure 10:
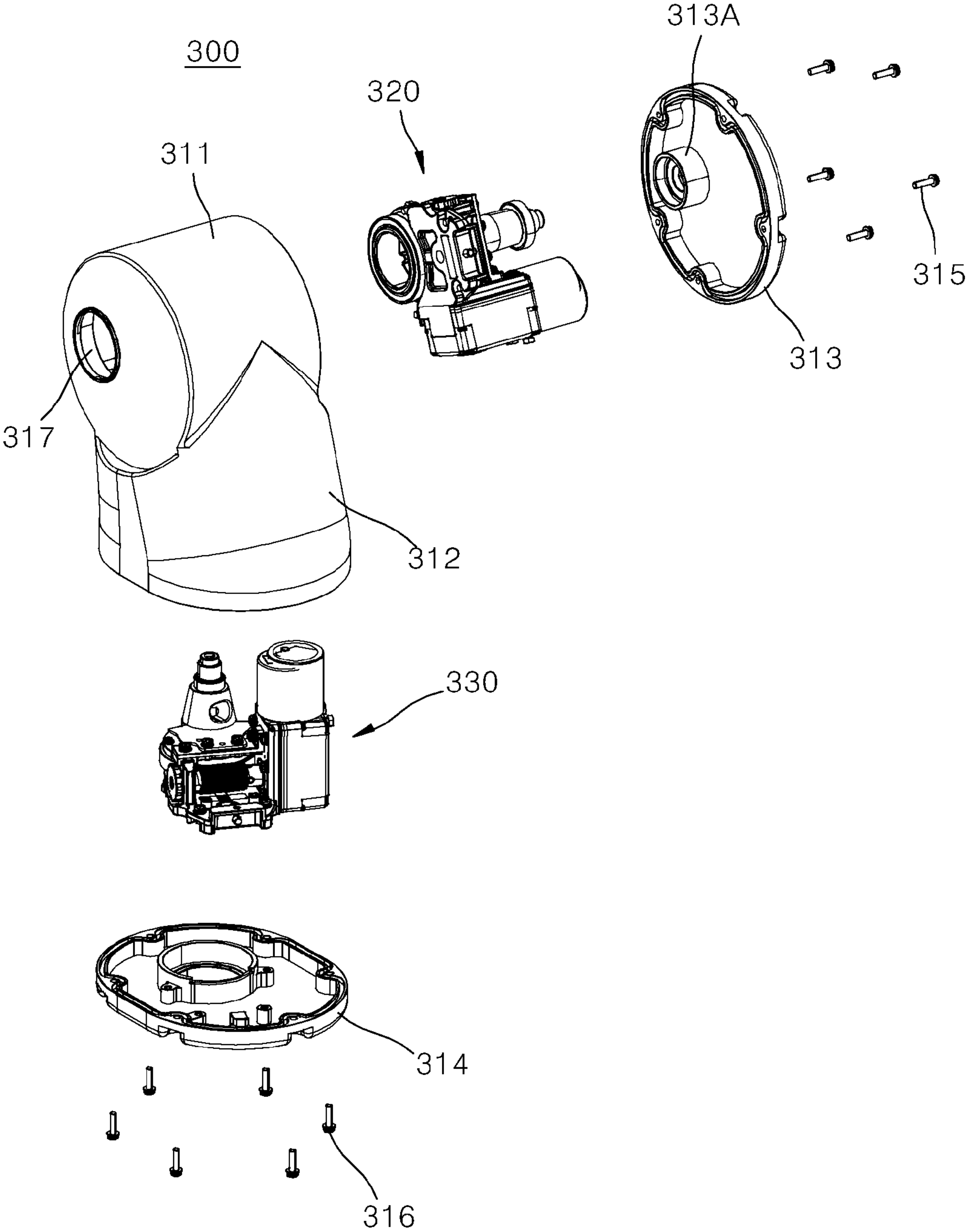
FIG. 10 is an exploded perspective view of FIG. 8.
Figure 11:
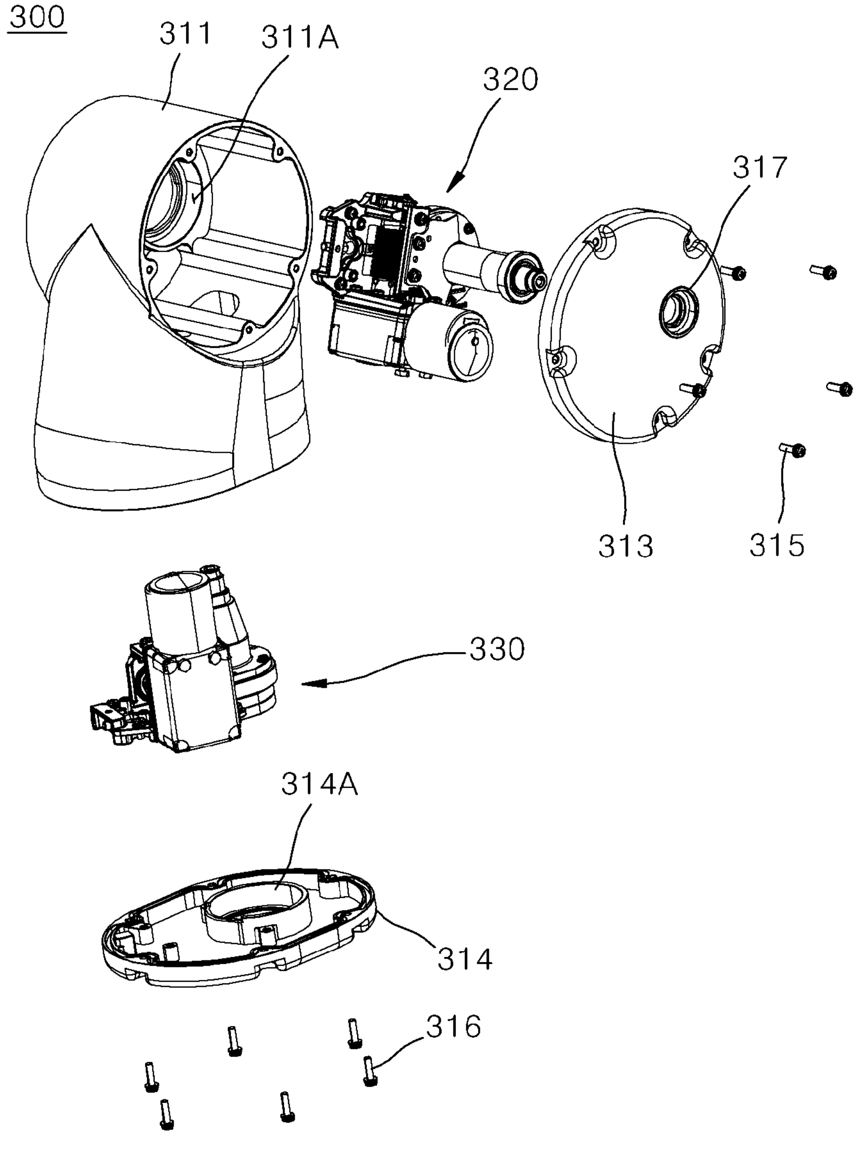
FIG. 11 is an exploded perspective view of FIG. 10 viewed from the opposite side.
Figure 12:
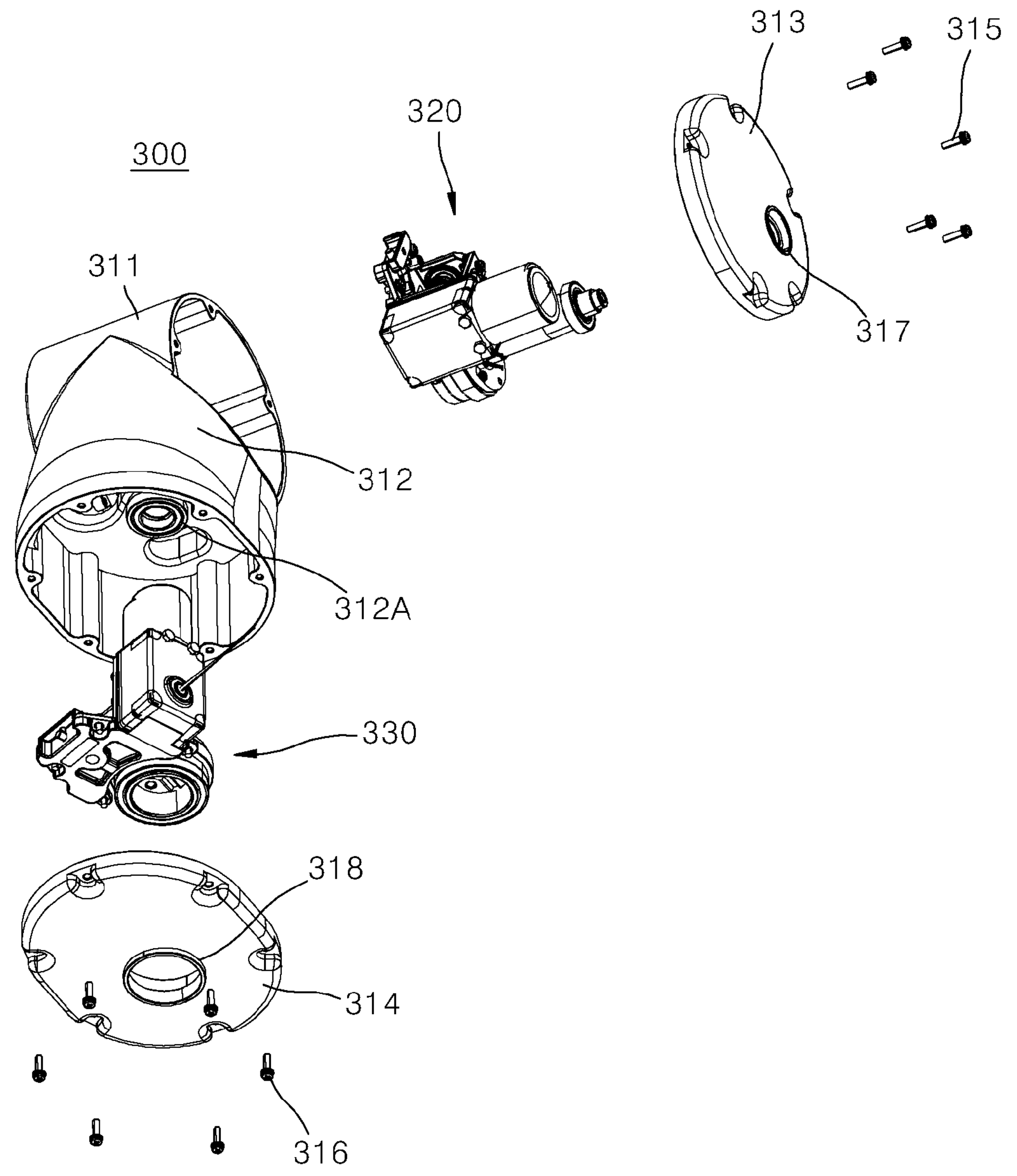
FIG. 12 is an exploded perspective view of FIG. 10 viewed from the bottom.

FIG. 10 is an exploded perspective view of FIG. 8, FIG. 11 is an exploded perspective view of FIG. 10 viewed from the opposite side, and FIG. 12 is an exploded perspective view of FIG. 10 viewed from the bottom.

Referring to FIGS. 10 to 12, the tilting driving unit 320 and the rotation driving unit 330 may be disposed in the integrating housing 310.

The tilting driving unit 320 may rotate the tilting bracket 100 in the vertical direction, and the rotation driving unit 330 may rotate the integrating housing 310 in the horizontal direction.

The tilting driving unit 320 may be disposed above the rotation driving unit 330. In other words, the rotation driving unit 330 may be disposed under the tilting driving unit 320. The tilting driving unit 320 may be disposed inside the upper portion 311 of the integrating housing 310, and the rotation driving unit 330 may be disposed inside the lower portion 312 of the integrating housing 310.

As described above, since the tilting driving unit 320 and the rotation driving unit 330 are disposed in the vertical direction, the integrating housing 310 may have a substantially vertically long shape. In this case, the integrating housing 310 may be disposed on the upper surface of the base bracket 200. In other words, the lower surface of the integrating housing 310 may be seated on the upper surface of the base bracket 200, and the integrating housing 310 may be coupled to the base bracket 200 in the form of protruding upward.

The upper portion 311 of the integrating housing 310 may have an open one side. The open one side of the upper portion 311 of the integrating housing 310 may be covered by an upper cover 313. The upper cover 313 may form one side surface of the integrating housing 310. The upper cover 313 may form one side surface of the upper portion 311 of the integrating housing 310.

The upper cover 313 may be fastened to the upper portion 311 of the integrating housing 310 through a plurality of screws 315. The plurality of screw holes into which the plurality of screws 315 are inserted may be formed in the upper cover 313, and the plurality of screw holes into which the plurality of screws 315 are respectively inserted may be formed in one side of the upper portion 311 of the integrating housing 310.

Any one of the tilting holes 317 on both sides may be formed in the non-open other side of the upper portion 311 of the integrating housing 310, and the other may be formed in the upper cover 313.

The lower portion 312 of the integrating housing 310 may be open. A lower side of the open lower portion 312 of the integrating housing 310 may be covered by a lower cover 314. The lower cover 314 may form a lower side surface of the integrating housing 310. The lower cover 314 may form a lower side surface of the lower portion 312 of the integrating housing 310.

The lower cover 314 may be fastened to the lower portion 312 of the integrating housing 310 through the plurality of screws 316. The plurality of screw holes into which the plurality of screws 316 are respectively inserted may be formed in the lower cover 314, and the plurality of screw holes into which the plurality of screws 316 are respectively inserted may be formed in the lower side of the lower portion 312 of the integrating housing 310.

The rotation hole 318 may be formed in the lower cover 314.

FIG. 13 is an exploded perspective view of a tilt driving unit shown in FIGS. 10 to 12, and FIG. 14 is an exploded perspective view of FIG. 13 viewed from the bottom.

Referring to FIGS. 10 to 14, the tilting driving unit 320 may include a tilting motor 321, a tilting reducer 322, a tilting worm shaft 323, and a tilting rotation shaft 325.

The tilting motor 321 may constitute a lower portion of the tilting driving unit 320 together with the tilting reducer 322. A rotation shaft of the tilting motor 321 may be disposed in the horizontal direction.

The tilting reducer 322 may receive and convert a rotation speed of the rotation shaft of the tilting motor 321 through an input shaft (not shown) and then output the converted rotation speed through an output shaft 322A. The tilting reducer 322 may include a rectangular tilting reducer housing and a plurality of gears provided inside the tilting reducer housing. The input shaft of the tilting reducer 322 may be provided at the center of any one of the plurality of gears disposed inside the tilting reducer housing, and the output shaft 322A of the tilting reducer 322 may be provided at the center of the other.

The rotation shaft of the tilting motor 321 may be inserted into the tilting reducer housing through a hole formed in one side surface of the tilting reducer housing. In addition, the output shaft 322A of the tilting reducer 322 may be disposed to protrude outward from the tilting reducer housing through a hole formed in an upper surface of the tilting reducer housing.

The rotation shaft of the tilting motor 321 may be inserted into the tilting reducer housing and coupled to the input shaft of the tilting reducer 322 provided inside the tilting reducer housing. In other words, the input shaft of the tilting reducer 322 may be coupled to the rotation shaft of the tilting motor 321.

The tilting driving unit 320 may further include a tilting driving bracket 327 fixedly installed inside the upper portion 311 of the integrating housing 310. The tilting driving bracket 327 may be coupled to the tilting reducer 322 through a fastening member. The tilting driving bracket 327 may be formed by fastening a plurality of plate-shaped brackets through the fastening member.

The tilting worm shaft 323 may be rotatably coupled to the tilting driving bracket 327 and disposed vertically. The tilting worm shaft 323 may be rotatably coupled to the tilting driving bracket 327 through a bearing. The bearing rotatably coupling the tilting worm shaft 323 to the tilting driving bracket 327 may include a bearing installed on an outer circumferential surface of an upper end of the tilting worm shaft 323 and a bearing installed on an outer circumferential surface of a lower end of the tilting worm shaft 323.

The tilting worm shaft 323 may be coupled to the output shaft 322A of the tilting reducer 322. The tilting worm shaft 323 may be formed to be hollow, and the output shaft 322A of the tilting reducer 322 may be inserted into the hollow of the tilting worm shaft 323. The tilting worm shaft 323 may be rotated in the same direction together with the output shaft 322A of the tilting reducer 322 when the output shaft 322A of the tilting reducer 322 is rotated. A tilting worm gear 324 may be provided on an outer circumferential surface of the tilting worm shaft 323.

A tilting worm wheel gear 326 engaged with the tilting worm gear 324 may be provided on an outer circumferential surface of the tilting rotation shaft 325. Therefore, when the tilting worm shaft 323 is rotated, the tilting rotation shaft 325 may rotate together with the tilting worm shaft 323.

The tilting rotation shaft 325 may be rotatably installed in the upper portion 311 of the integrating housing 310 through bearings 325A and 325B installed on the outer circumferential surface thereof. The bearings 325A and 325B may include the first bearing 325A installed on an outer circumferential surface of one end of the tilting rotation shaft 325 and the second bearing 325B installed on an outer circumferential surface of the other end of the tilting rotation shaft 325.

A first bearing mounting portion 311A into which the first bearing 325A is inserted and mounted may be formed on an inner surface of the other side of the upper portion 311 of the integrating housing 310. The first bearing mounting portion 311A may be formed to communicate with the tilting hole 317 formed in the other side of the upper portion 311 of the integrating housing 310.

A second bearing mounting portion 313A into which the second bearing 325B is inserted and mounted may be formed on an inner surface of the upper cover 313. The second bearing mounting portion 313A may be formed to communicate with the tilting hole 317 formed in the upper cover 313.

The tilting rotation shaft 325 may be horizontally disposed and coupled to the tilting bracket 100. In other words, the tilting bracket wing 120 may be coupled to the tilting rotation shaft through the tilting holes 317 formed in both sides of the integrating housing 310. Specifically, each of both ends of the tilting rotation shaft 325 may be connected by the bolts passing through the tilting hole 317 formed in both sides of the upper portion 311 of the integrating housing 310 and the holes form in the rear ends of the tilting bracket wings 120 on both sides of the tilting bracket 100.

Meanwhile, a tilting encoder 328 for detecting a rotation speed of the tilting rotation shaft 325 may be installed on the tilting driving bracket 327. The tilting encoder 328 may be disposed opposite to one side of the tilting worm wheel gear 326, and at least one tilting magnet detected by the tilting encoder 328 may be provided on the one surface of the tilting worm wheel gear 326. When the tilting rotation shaft 325 is rotated, the tilting encoder 328 may detect the tilting magnet to detect the rotation speed of the tilting rotation shaft 325.

FIG. 15 is an exploded perspective view of the rotation driving unit shown in FIGS. 10 to 12, and FIG. 16 is an exploded perspective view of FIG. 15 viewed from the bottom.

Referring to FIGS. 10 to 12, 15, and 16, the rotation driving unit 330 may have a structure similar to that of the tilting driving unit 320. However, the rotation driving unit 330 may further include a rotation fixing shaft 339 as compared to the tilting driving unit 320.

Specifically, the rotation driving unit 330 may include a rotation motor 331, a rotation reducer 332, a rotation worm shaft 333, a rotation shaft 335, and the rotation fixing shaft 339.

The rotation motor 331 may constitute one side of the rotation driving unit 330 together with the rotation reducer 332. A rotation shaft of the rotation motor 331 may be disposed vertically.

The rotation reducer 332 may receive and convert the rotation speed of the rotation shaft of the rotation motor 331 through an input shaft (not shown) and then output the converted rotation speed through an output shaft 332A. The rotation reducer 332 may include a rectangular rotation reducer housing and a plurality of gears provided inside the rotation reducer housing. The input shaft of the rotation reducer 332 may be provided at the center of any one of the plurality of gears disposed inside the rotation reducer housing, and the output shaft 332A of the rotation reducer 332 may be provided at the center of the other.

The rotation shaft of the rotation motor 331 may be inserted into the rotation reducer housing through a hole formed in an upper surface of the rotation reducer housing. In addition, the output shaft 332A of the rotation reducer 332 may be disposed to protrude outward from the rotation reducer housing through a hole formed in one side surface of the rotation reducer housing.

The rotation shaft of the rotation motor 331 may be inserted into the rotation reducer housing and coupled to the input shaft of the rotation reducer 332 provided inside the rotation reducer housing. In other words, the input shaft of the rotation reducer 332 may be coupled to the rotation shaft of the rotation motor 331.

The rotation driving unit 330 may further include a rotation driving bracket 337 fixedly installed inside the lower portion 312 of the integrating housing 310. The rotation driving bracket 337 may be fastened to the rotation reducer 332 through a fastening member. The rotation driving bracket 337 may be formed by fastening a plurality of plate-shaped brackets through the fastening member.

The rotation worm shaft 333 may be rotatably coupled to the rotation driving bracket 337 and disposed horizontally. The rotation worm shaft 333 may be rotatably coupled to the rotation driving bracket 337 through a bearing. The bearing rotatably coupling the rotation worm shaft 333 to the rotation driving bracket 337 may include a bearing installed on an outer circumferential surface of one end of the rotation worm shaft 333 and a bearing installed on an outer circumferential surface of the other end of the rotation worm shaft 333.

The rotation worm shaft 333 may be coupled to the output shaft 332A of the rotation reducer 332. The rotation worm shaft 333 may be formed to be hollow, and the output shaft 332A of the rotation reducer 332 may be inserted into the hollow of the rotation worm shaft 333. The rotation worm shaft 333 may be rotated in the same direction together with the output shaft 332A of the rotation reducer 332 when the output shaft 332A of the rotation reducer 332 is rotated. A rotation worm gear 334 may be provided on an outer circumferential surface of the rotation worm shaft 333.

A rotation worm wheel gear 336 engaged with the rotation worm gear 334 may be provided on an outer circumferential surface of the rotation shaft 335. Therefore, when the rotation worm shaft 333 is rotated, the rotation shaft 335 may be rotated together with the rotation worm shaft 333.

The rotation shaft 335 may be rotatably installed in the lower portion 312 of the rotation housing 310 through bearings 335A and 335B installed on the outer circumferential surface thereof. The bearings 335A and 335B may include the third bearing 335A installed on an outer circumferential surface of an upper end of the rotation shaft 335 and the fourth bearing 335B installed on an outer circumferential surface of the lower end of the rotation shaft 335.

A third bearing mounting portion 312A into which the third bearing 335A is inserted and mounted may be formed on an upper inner surface of the lower portion 312 of the rotation housing 310.

A fourth bearing mounting portion 314A into which the fourth bearing 335B is inserted and mounted may be formed on an upper surface, which is an inner surface of the lower cover 314. The fourth bearing mounting portion 314A may be formed to communicate with the rotation hole 318 formed in the lower cover 314.

The rotation shaft 335 may be vertically disposed and coupled to the integrating housing 310. In other words, the rotation shaft 335 may be installed inside the lower portion 312 of the integrating housing 310 to rotate the integrating housing 310 when rotated.

The rotation fixing shaft 339 may rotatably support the rotation shaft 335. The rotation shaft 335 may be rotatably installed on an outer circumference of the rotation fixing shaft 339.

The rotation fixing shaft 339 may be horizontally disposed and fixed to the base bracket 200. In other words, the center protrusion 210 formed on the base bracket 200 may be coupled to the rotation fixing shaft 339 through the rotation hole 318 formed on the lower surface of the integrating housing 310. Specifically, the center protrusion 210 formed on the upper surface of the base bracket 200 may be inserted into the rotation hole 318 formed in the lower surface of the lower portion 312 of the integrating housing 310, and the lower end of the rotation fixing shaft 339 may be connected by the plurality of bolts 12 (see FIGS. 5 to 7) respectively inserted into the plurality of bolt holes formed in the center protrusion 210. However, the center protrusion 210 may also be installed at the center of the base bracket 200 to be rotated in the horizontal direction, in which case the rotation fixing shaft 339 is not required, and the lower end of the rotation shaft 335 may also be coupled to the center protrusion 210.

Meanwhile, a rotation encoder 338 for detecting a rotation speed of the rotation shaft 335 may be installed in the rotation driving bracket 337. The rotation encoder 338 may be disposed opposite to an upper surface of the rotation worm wheel gear 336, and at least one rotation detected by the rotation encoder 338 may be provided on the upper surface of the rotation worm wheel gear 336. When the rotation shaft 335 is rotated, the rotation encoder 338 may detect the rotation magnet to detect the rotation speed of the rotation shaft 335.

Figure 17:
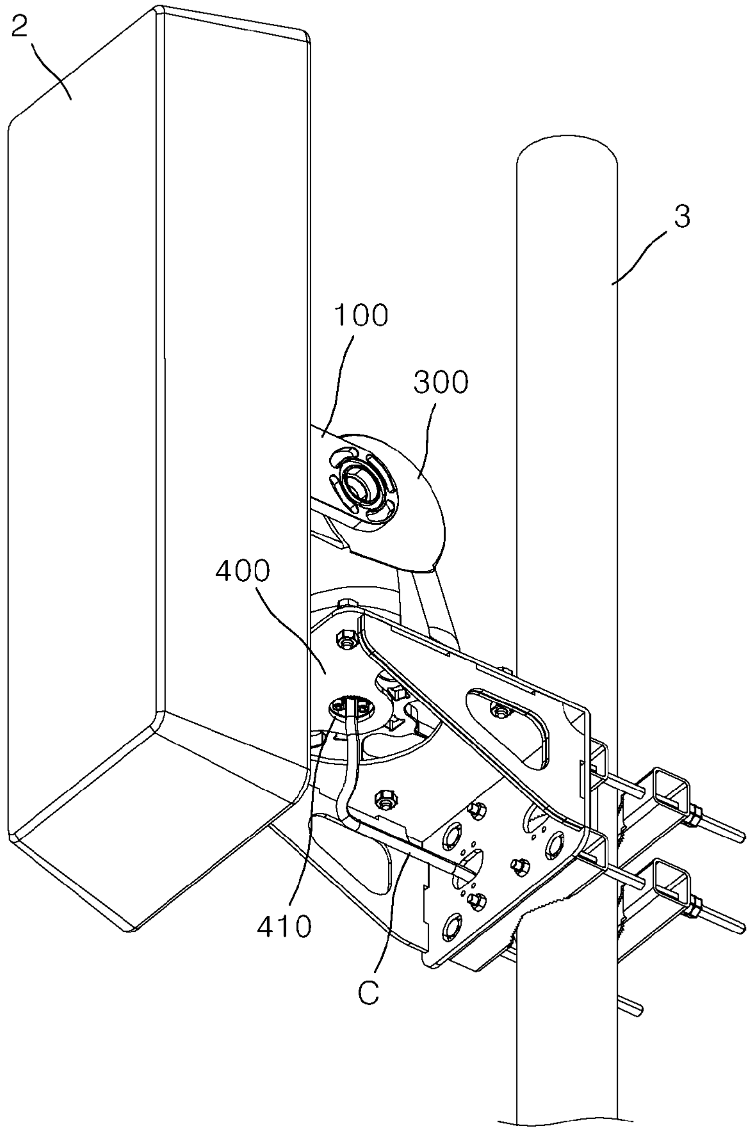
FIG. 17 is a bottom perspective view showing a state in which the antenna is installed on the support pole through the clamping apparatus for an antenna according to the first embodiment of the present disclosure.

FIG. 17 is a bottom perspective view showing a state in which the antenna is installed on the support pole through the clamping apparatus for an antenna according to the first embodiment of the present disclosure.

Referring to FIGS. 7 and 17, holes 410 and 213 through which a direction control cable C passes may be formed in each of the installation bracket 400 and the center protrusion 210. The direction control cable C may be a cable for controlling the direction of the antenna 2 by controlling the tilting driving unit 320 and the rotation driving unit 330.

In other words, an upper end of the direction control cable C may pass through the hole 410 formed in the installation bracket 400 and the hole 213 formed in the center protrusion 210, then be inserted into the integrating housing 310, and connected to the tilting motor 321 and the rotation motor 331. Specifically, the upper end of the direction control cable C may be inserted into the rotation fixing shaft 339 in the integrating housing 310 and may get out to an internal space of the integrating housing 310 through the upper end of the rotation fixing shaft 339 or get out to the inner space of the integrating housing 310 through the hole formed in the outer circumferential surface of the rotation fixing shaft 339 to be connected to the tilting motor 321 and the rotation motor 331.

In addition, a connector (not shown) connected to an antenna direction controller (not shown) for controlling the direction of the antenna 2 may be provided on a lower end of the direction control cable C.

In a state where the antenna 2 is installed on the support pole 3 through the clamping apparatus 1 for an antenna, when an operator intends to adjust the direction of the antenna 2, the operator may adjust the vertical direction and horizontal direction of the antenna 2 by operating the antenna direction controller to control the tilting motor 321 and the rotation motor 331 after connecting the connector provided on the lower end of the direction control cable C to the antenna direction controller.

Figure 18:
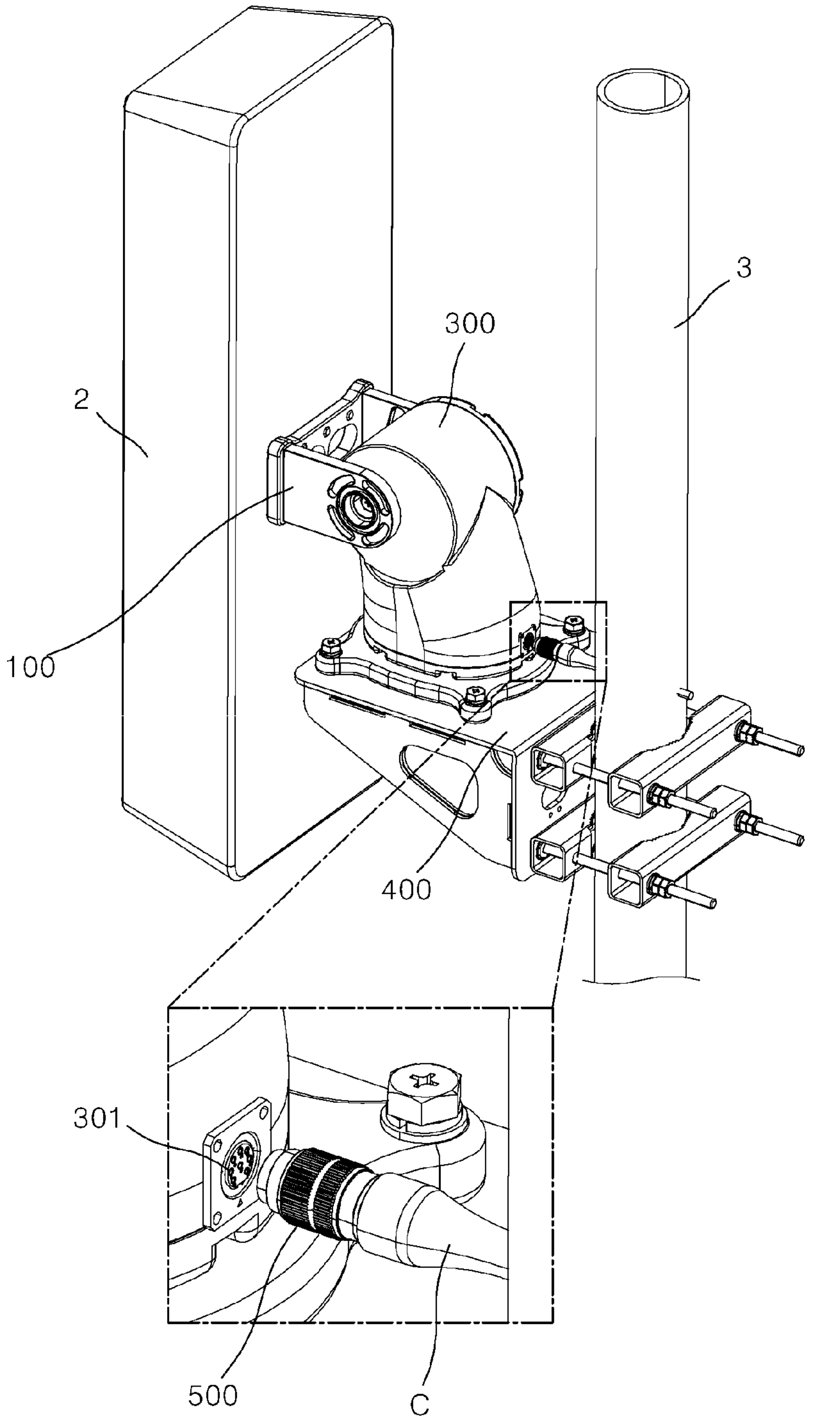
FIG. 18 is a view showing another embodiment of the direction control cable shown in FIG. 17.

FIG. 18 is a view showing another embodiment of the direction control cable shown in FIG. 17.

Referring to FIG. 18, the direction control cable C may be directly connected to the integrating housing 310 of the integrating rotation driving unit 300 without passing through the installation bracket 400 and the base bracket 200.

In this case, a connector 500 may be provided on one end of the direction control cable C for controlling the tilting driving unit 320 and the rotation driving unit 330, and a socket 301 to which the connector 500 is connected may be provided on the outer circumferential surface of the integrating housing 310. Here, the socket 301 may be electrically connected to the tilting motor 321 and the rotation motor 331 provided inside the integrating housing 310.

Figure 19:
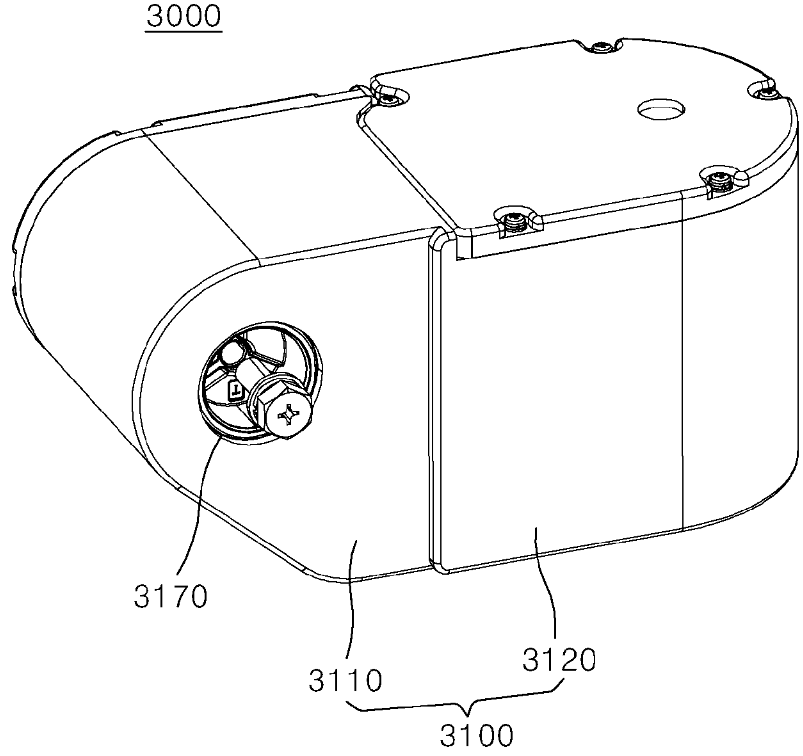
FIG. 19 is a perspective view showing an integrating rotation driving unit included in a clamping apparatus for an antenna according to a second embodiment of the present disclosure.
Figure 20:
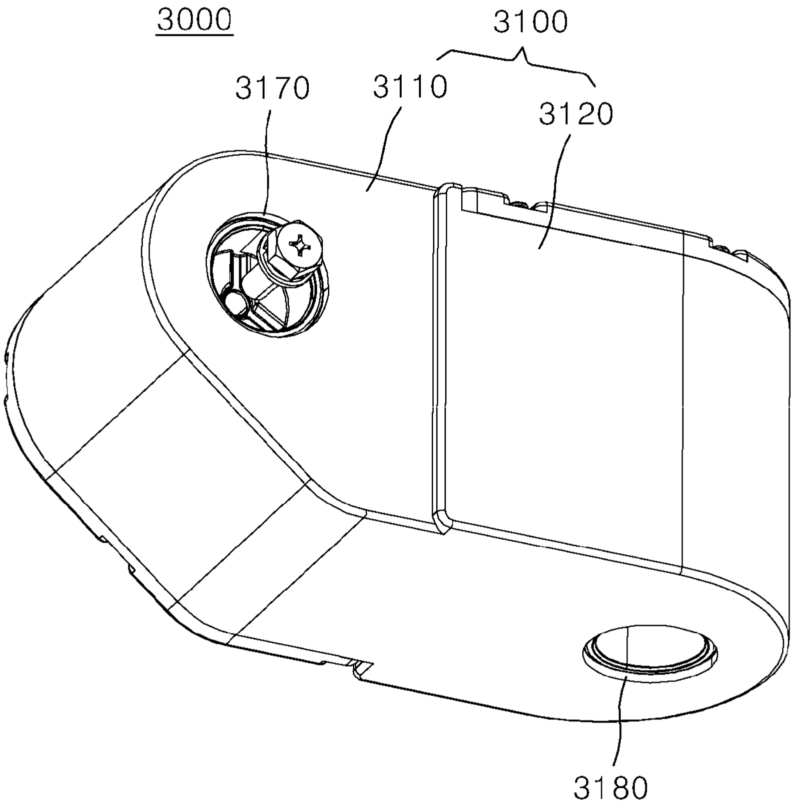
FIG. 20 is a perspective view of FIG. 19 viewed from the bottom.

FIG. 19 is a perspective view showing an integrating rotation driving unit included in a clamping apparatus for an antenna according to a second embodiment of the present disclosure, and FIG. 20 is a perspective view of FIG. 19 viewed from the bottom.

Referring to FIGS. 19 and 20, it can be seen that an integrating rotation driving unit 3000 included in the clamping apparatus for an antenna according to a second embodiment of the present disclosure is different from the integrating rotation driving unit 300 included in the clamping apparatus 1 for an antenna according to the first embodiment.

In other words, the integrating housing 310 of the integrating rotation driving unit 300 according to the first embodiment is composed of the upper portion 311 and the lower portion 312, the tilting driving unit 320 is disposed inside the upper portion 311, and the rotation driving unit 330 is disposed inside the lower portion 312, and thus the tilting driving unit 320 is disposed above the rotation driving unit 330.

However, an integrating housing 3100 of the integrating rotation driving unit 3000 according to the second embodiment may be composed of a front portion 3110 having tilting holes 3170 formed in both sides thereof and a rear portion 3120 having rotation holes 3180 formed in a lower surface thereof, the tilting driving unit 320 having the same structure as in the first embodiment may be disposed inside the front portion 3110, and the rotation driving unit 330 having the same structure as in the first embodiment may be disposed inside the rear portion 3120, and thus the tilting driving unit 320 may be disposed in front of the rotation driving unit 330.

In this case, the rear portion 3120 of the integrating housing 3100 may be disposed on the same upper surface of the base bracket 200 as in the first embodiment. The front portion 3110 of the integrating housing 3100 may be disposed to protrude forward from the base bracket 200 having the same structure as in the first embodiment.

As in the second embodiment, when the integrating housing 3100 is composed of the front portion 3110 and the rear portion 3120, the tilting driving unit 320 is disposed inside the front portion 3110, and the rotation driving unit 330 is disposed inside the rear portion 3120 to constitute the integrating rotation driving unit 3000, front and rear positions of the front portion 3110 and the rear portion 3120 are changed to arrange the front portion 3110 behind the rear portion 3120 and then the integrating rotation driving unit 3000 is laid at 90 degrees, and thus the front portion 3110 may be installed on the upper surface of the base bracket 200, and the tilting brackets 100 may be installed on both sides of the rear portion 3120. In other words, in case of constituting the integrating rotation driving unit 3000 as in the second embodiment, the tilting driving unit 320 may serve as the rotation driving unit 330, and the rotation driving unit 330 may serve as the tilting driving unit 320.

Since the remaining components that are not described in the second embodiment are the same as those in the first embodiment, descriptions thereof will be omitted.

Figure 21:
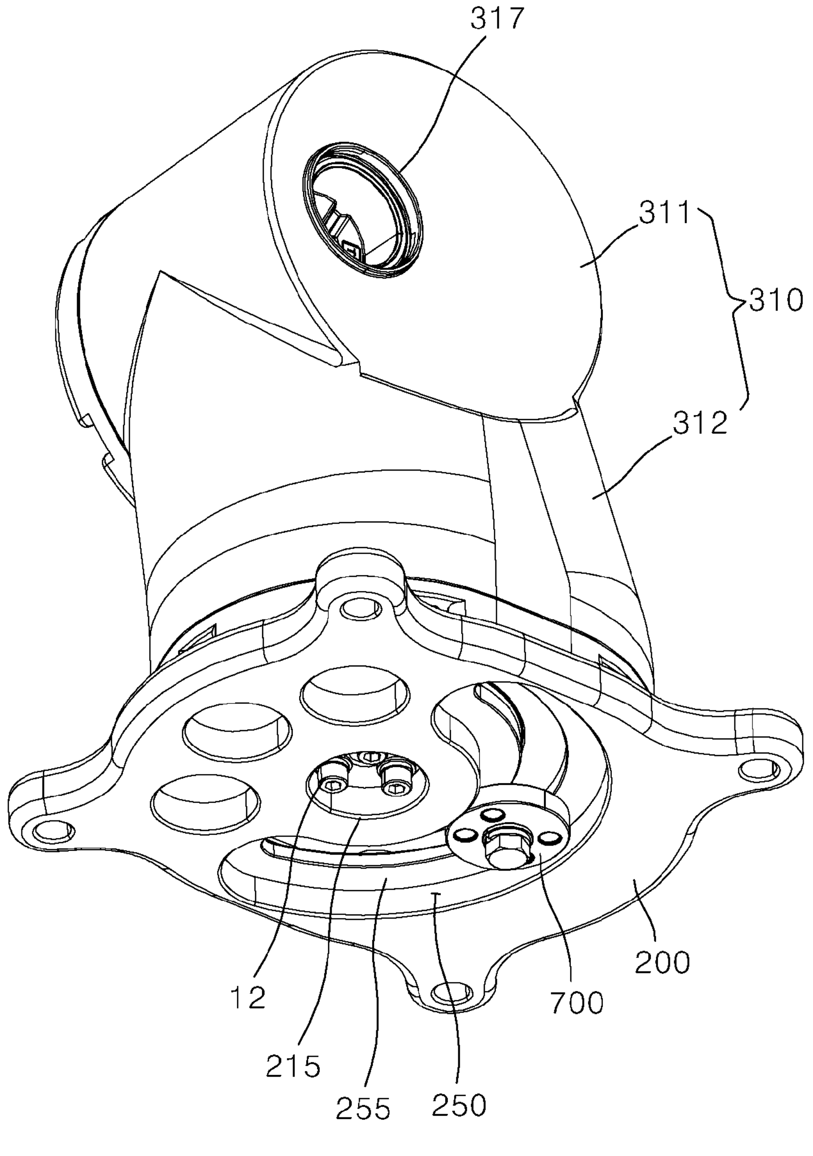
FIG. 21 is a bottom perspective view showing an integrating rotation driving unit and a base bracket included in a clamping apparatus for an antenna according to a third embodiment of the present disclosure.
Figure 22:
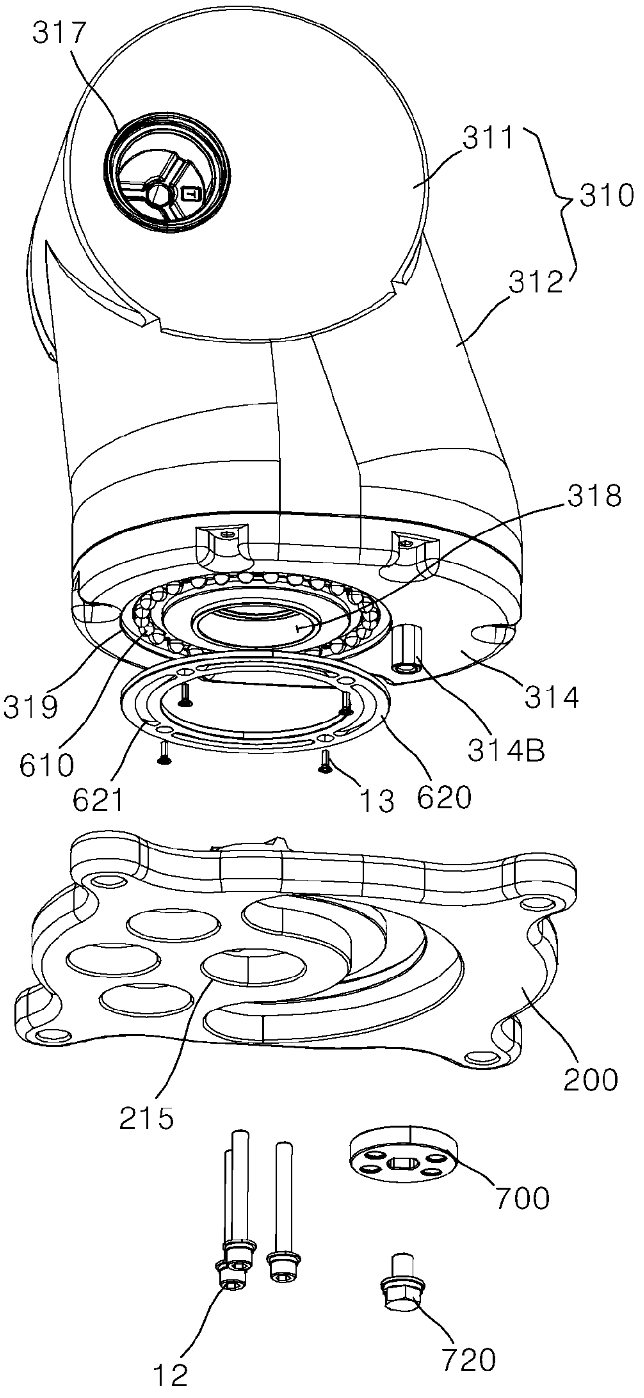
FIG. 22 is an exploded perspective view of FIG. 21.
Figure 23:
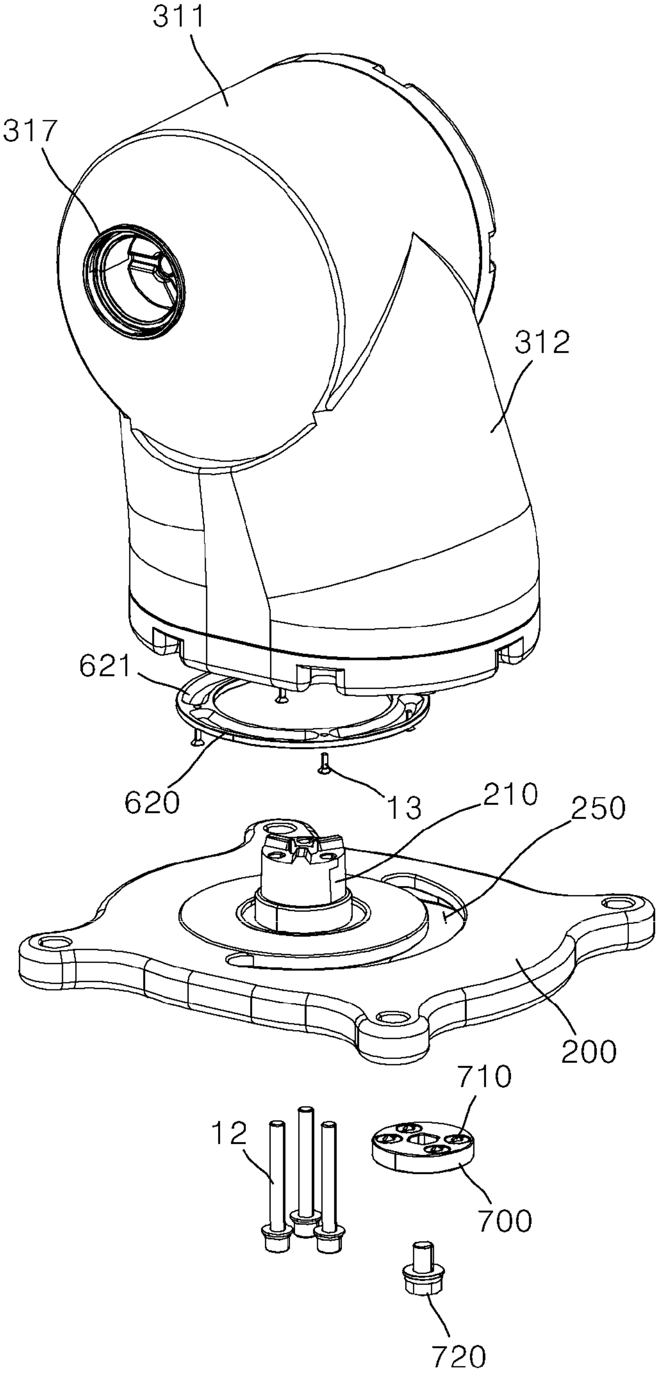
FIG. 23 is an exploded perspective view of FIG. 22 viewed from the top.

FIG. 21 is a bottom perspective view showing an integrating rotation driving unit and a base bracket included in a clamping apparatus for an antenna according to a third embodiment of the present disclosure, FIG. 22 is an exploded perspective view of FIG. 21, and FIG. 23 is an exploded perspective view of FIG. 22 viewed from the top. Here, the same reference numerals are given to the same configurations as those of the first embodiment described above, detailed descriptions thereof will be omitted, and only differences will be described.

Referring to FIGS. 21 to 23, it can be seen that the clamping apparatus for an antenna according to the third embodiment of the present disclosure is different from that of the above-described first embodiment.

In other words, in the above-described first embodiment, the plurality of rollers 220 (see FIGS. 4 and 7) are installed on the base bracket 200 to guide the horizontal rotation of the integrating housing 310.

However, in the third embodiment, a plurality of balls 610 may be rotatably installed on the lower surface of the integrating housing 310 to guide the horizontal rotation of the integrating housing 310. The plurality of balls 610 may come into contact with the upper surface of the base bracket 200 to guide the horizontal rotation of the integrating housing 310.

In this case, a ring-shaped ball insertion groove 319 into which the plurality of balls 610 are inserted may be formed in the lower surface of the integrating housing 310. The ball insertion groove 319 may be formed in a lower surface of the lower cover 314.

In addition, a ball cover 620 may be coupled to the lower surface of the integrating housing 310. The ball cover 620 may be coupled to the lower surface of the integrating housing 310 through a plurality of screws 13. The ball cover 620 may be formed in a ring shape and may have holes into which each of the plurality of screws 13 is inserted. The ball cover 620 may be coupled to the lower surface of the lower cover 314. At least one ball protrusion hole 621 may be formed in the ball cover 620. The plurality of balls 610 inserted into the ball insertion groove 319 may protrude downward from the at least one ball protrusion hole 621.

The ball protrusion hole 621 may be formed in an arc shape, and in the third embodiment, a plurality of ball protrusion holes 621 may be present, and four ball protrusion holes 621 may be formed.

In addition, an arc-shaped guide hole 250 extending vertically may be formed in the base bracket 200, and a ball guider 700 may be disposed under the base bracket 200. The ball guider 700 may be coupled to the lower surface of the integrating housing 310 through the guide hole 250. Specifically, a coupling boss 314B may be formed to protrude from the lower surface of the integrating housing 310. The coupling boss 314B may be formed to protrude from the lower surface of the lower cover 314. Since the bolt 720 passes through the hole formed at the center of the ball guider 700 and the guide hole 250 and then is fastened to the coupling boss 314B, the ball guider 700 may be coupled to the lower surface of the integrating housing 310.

A plurality of rotatable balls 710 may be disposed to protrude from the upper surface of the ball guider 700. The plurality of balls 710 may come into contact with the lower surface of the base bracket 200. When the integrating housing 310 is rotated in the horizontal direction, the ball guider 700 may be rotated in the horizontal direction together with the integrating housing 310 in a state in which the plurality of balls 710 come into contact with the base bracket 200 to guide the horizontal rotation of the integrating housing 310.

Specifically, the ball guider 700 may be disposed to be inserted into the guide hole 250, and a step 255 may be formed in the guide hole 250 along a length of the guide hole 250. The plurality of balls 710 may come into contact with a lower surface of the step 255. Here, the step 255 may be formed by forming an upper side of the guide hole 250 that is less open than a lower side thereof. In this case, when the integrating housing 310 is rotated in the horizontal direction, the ball guider 700 is preferably formed in a disc shape so that the ball guider 700 may be easily moved along the length of the guide hole 250 even when the ball guider 700 comes into contact with an inner wall of the guide hole 250.

Figure 24:
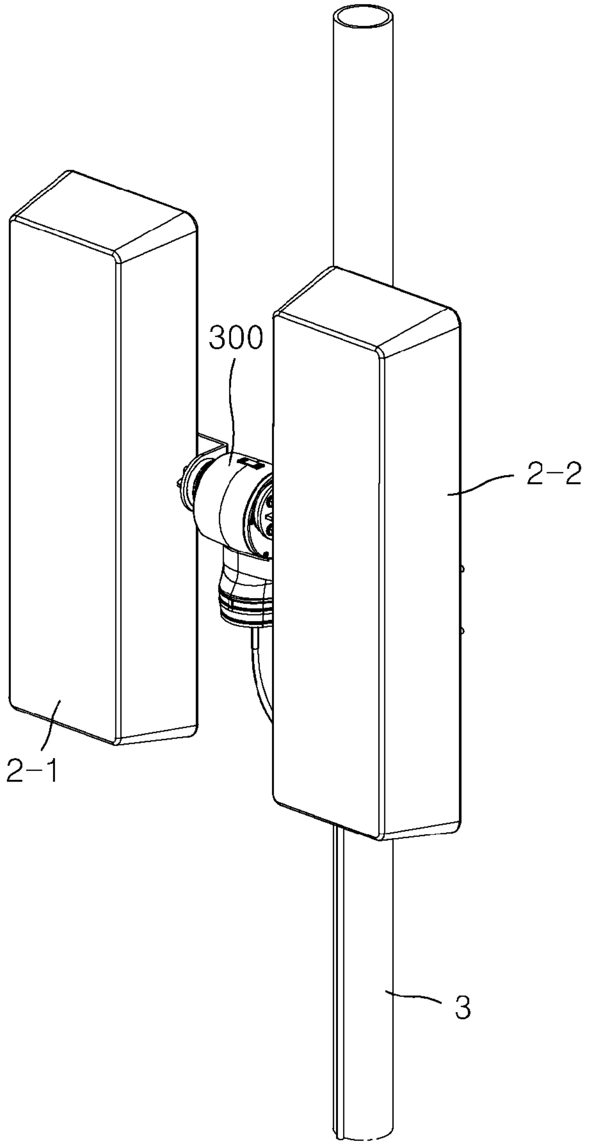
FIG. 24 is a front perspective view showing a state in which an antenna is installed on a support pole through a clamping apparatus for an antenna according to a fourth embodiment of the present disclosure.
Figure 25:
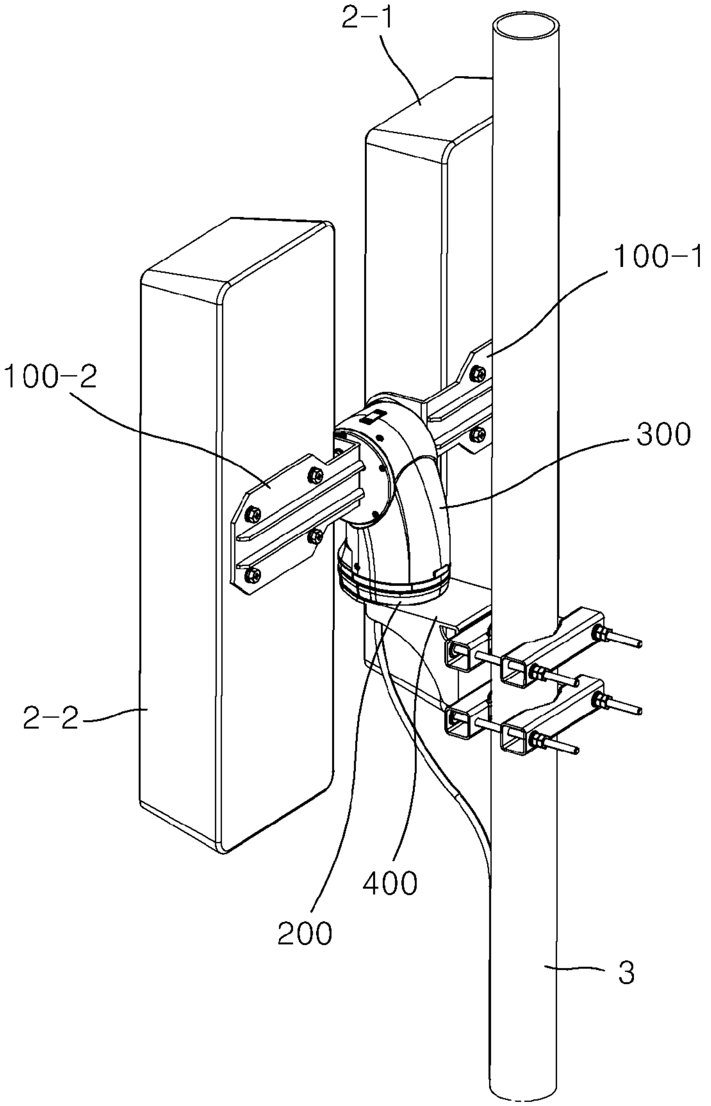
FIG. 25 is a rear perspective view of FIG. 24.
Figure 26:
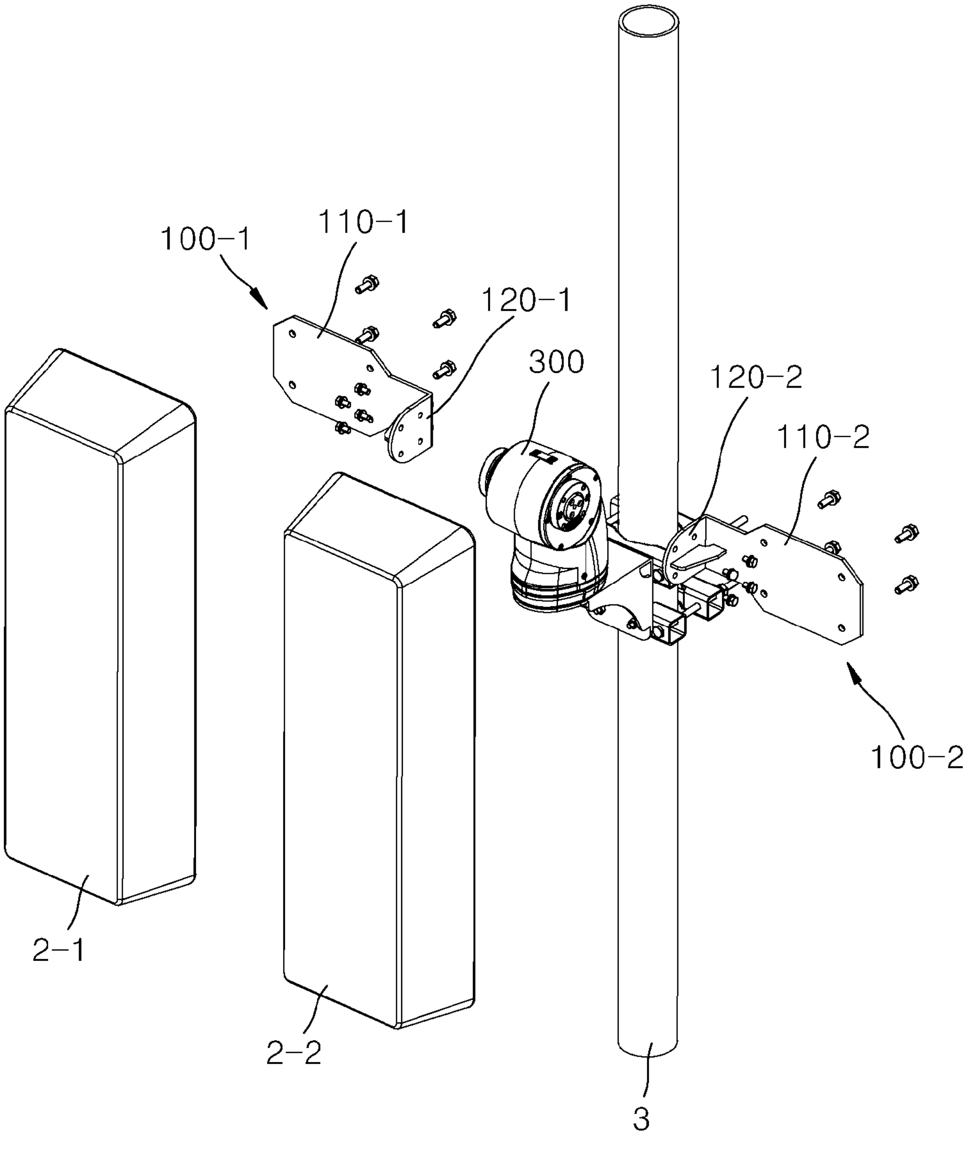
FIG. 26 is an exploded perspective view of FIG. 24.
Figure 27:
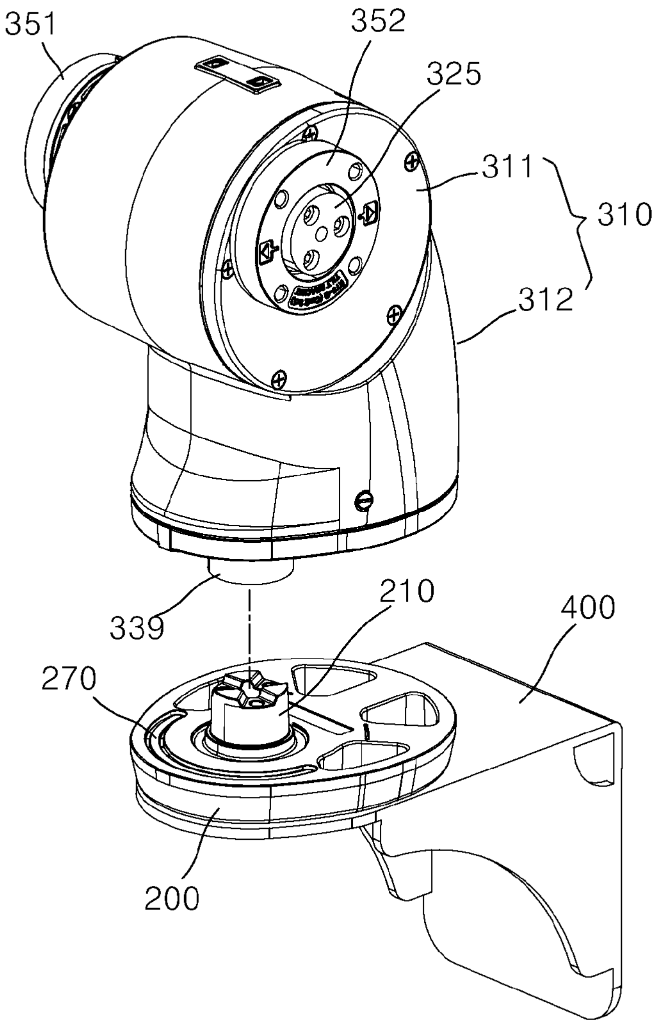
FIG. 27 is an exploded perspective view showing an integrating rotation driving unit, a base bracket, and an installation bracket included in the clamping apparatus for an antenna according to the fourth embodiment of the present disclosure.
Figure 28:
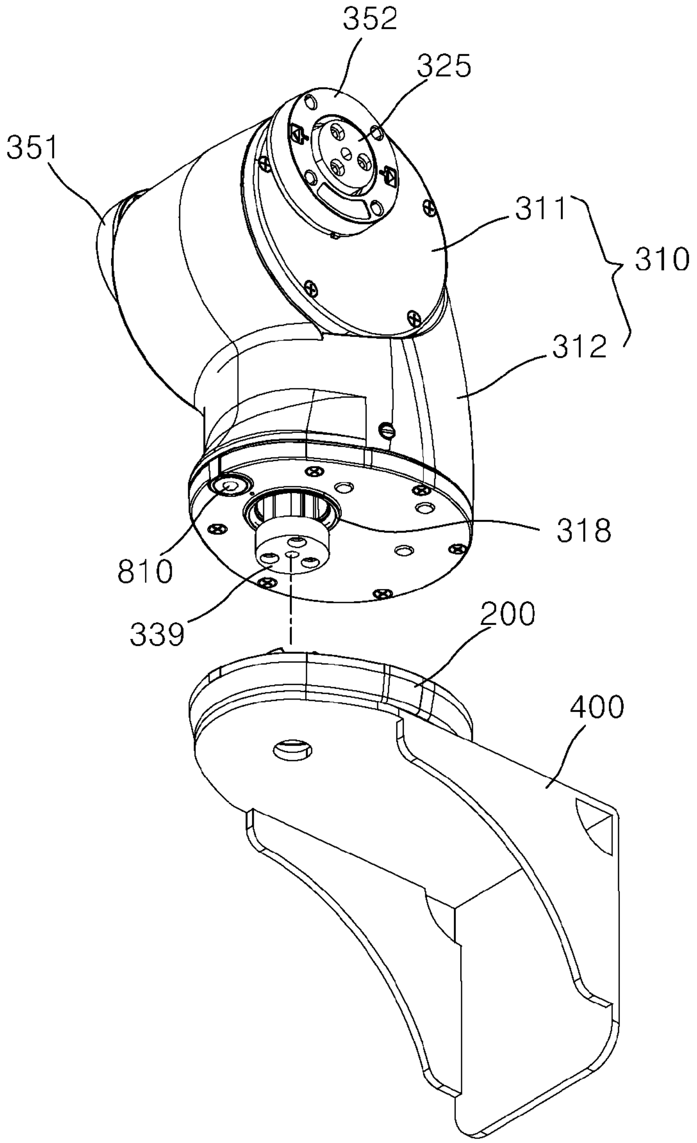
FIG. 28 is an exploded perspective view of FIG. 27 viewed from the bottom.

FIG. 24 is a front perspective view showing a state in which an antenna is installed on a support pole through a clamping apparatus for an antenna according to a fourth embodiment of the present disclosure, FIG. 25 is a rear perspective view of FIG. 24, FIG. 26 is an exploded perspective view of FIG. 24, FIG. 27 is an exploded perspective view showing an integrating rotation driving unit, a base bracket, and an installation bracket included in the clamping apparatus for an antenna according to the fourth embodiment of the present disclosure, and FIG. 28 is an exploded perspective view of FIG. 27 viewed from the bottom. Here, the same reference numerals are given to the same configurations as those of the first embodiment described above, detailed descriptions thereof will be omitted, and only differences will be described.

Referring to FIGS. 24 to 28, it can be seen that the clamping apparatus for an antenna according to the fourth embodiment of the present disclosure is different from that of the first embodiment described above.

In other words, in the above-described first embodiment, only one tilting bracket 100 is provided and one antenna 2 is coupled to one tilting bracket 100, but in the fourth embodiment, a pair of tilting brackets 100-1 and 100-2 may be provided, and a pair of antennas 2-1 and 2-2 may be respectively coupled to the pair of tilting brackets 100-1 and 100-2.

In other words, in the above-described first embodiment, one antenna 2 is installed on the integrating rotation driving unit 300 to be rotated in the vertical direction, but in the fourth embodiment, the pair of antennas 2-1 and 2-2 may be installed on the integrating rotation driving unit 300 to be rotated in the vertical direction.

The pair of tilting brackets 100-1 and 100-2 may include the first tilting bracket 100-1 and the second tilting bracket 100-2. The first tilting bracket 100-1 may be connected to the first antenna 2-1 to support the first antenna 2-1. The first tilting bracket 100-1 may be disposed on one side of the integrating housing 310. The second tilting bracket 100-2 may be connected to the second antenna 2-2 to support the second antenna 2-2. The second tilting bracket 100-2 may be disposed on the other side of the integrating housing 310.

The first tilting bracket 100-1 and the second tilting bracket 100-2 may be formed to have the same structure as each other. Specifically, the first tilting bracket 100-1 may include a first tilting bracket body 110-1 and a first tilting bracket wing 120-1, and the second tilting bracket 100-2 may include a second tilting bracket body 110-2 and a second tilting bracket wing 120-2.

The first tilting bracket body 110-1 may be coupled to a rear surface of the first antenna 2-1 through a plurality of bolts, and the second tilting bracket body 110-2 may be coupled to a rear surface of the second antenna 2-2 through a plurality of bolts. A plurality of stiffness reinforcing ribs may be formed to protrude from each of the rear surface of the first tilting bracket body 110-1 and the rear surface of the second tilting bracket body 110-2.

The first tilting bracket wing 120-1 may be formed to protrude forward from one side of the first tilting bracket body 110-1, and the second tilting bracket wing 120-2 may be formed to protrude forward from the one side of the first tilting bracket body 110-1. The first tilting bracket wing 120-1 may be formed to be bent forward from one end of the first tilting bracket body 110-1, and the second tilting bracket wing 120-2 may be formed to be bent forward from one end of the second tilting bracket body 110-2.

The first tilting bracket wing 120-1 may be coupled to the tilting rotation shaft 325 through a first tilting coupling member 351 formed on the one side of the integrating housing 310, and the second tilting bracket wing 120-2 may be coupled to the tilting rotation shaft 325 through a second tilting coupling member 352 formed on the other side of the integrating housing 310. Specifically, both ends of the tilting rotation shaft 325 may be disposed to protrude from both sides of the integrating housing 310 through the tilting holes 317 formed in both sides of the integrating housing 310, the first tilting coupling member 351 may be installed on the outer circumference of the one end of the tilting rotation shaft 325, the second tilting coupling member 352 may be installed on the outer circumference of the other end of the tilting rotation shaft 325, the first tilting bracket wing 120-1 may be coupled to the first tilting coupling member 351 through the plurality of bolts, and the second tilting bracket wing 120-2 may be coupled to the second tilting coupling member 352 through the plurality of bolts.

The rotation fixing shaft 339 disposed inside the integrating housing 310 may be disposed to protrude downward from the integrating housing 310 through the rotation hole 318 formed on the lower surface of the integrating housing 310. The center protrusion 210 formed at the center of the upper surface of the base bracket 200 may be coupled to the rotation fixing shaft 339 disposed to protrude downward from the integrating housing 310 through the rotation hole 318 through the plurality of bolts. Of course, when the rotation fixing shaft 339 is not provided, the rotation shaft 335 instead of the rotation fixing shaft 339 may be disposed to protrude downward from the integrating housing 310 through the rotation hole 318, and in this case, the center protrusion 210 may be coupled to the rotation shaft 335 disposed to protrude downward from the integrating housing 310 through the rotation hole 318 through the plurality of bolts.

The arc-shaped guide groove 270 may be formed in the upper surface of the base bracket 200. In addition, a ball 810 may be rotatably installed on the lower surface of the integrating housing 310. The ball 810 may be inserted into the guide groove 270 to guide the horizontal rotation of the integrating housing 310. The ball 810 may be rotatably installed on the lower surface of the integrating housing 310 by a ball cover having a hole through which the ball 810 is disposed to protrude downward.

As described above, the clamping apparatus for an antenna according to the embodiments of the present disclosure includes the tilting driving unit 320 configured to rotate the antenna 2 in the vertical direction and the rotation driving unit 330 configured to rotate the antenna 2 in the horizontal direction, which are disposed in the integrating housings 310 and 3100. In other words, since the tilting driving unit 320 and the rotation driving unit 330 are installed together in one integrating housing 310 or 3100 to constitute one integrating rotation driving unit 300 or 3000, the structure may be simpler, and the size may become smaller.

In addition, in the clamping apparatus for an antenna according to the embodiments of the present disclosure, when the antenna 2 is installed on the support pole 3 through the clamping apparatus for an antenna, the antenna 2 may be installed close to the support pole 3, the installation position and installation direction of the antenna 2 are not easily changed by the wind, and it is possible to reduce the sense of disgust due to the excessively protruding installation of the antenna 2.

Those skilled in the art to which the present disclosure pertains will be able to understand that the present disclosure may be implemented in other specific forms without changing the technical spirit or essential features thereof. Therefore, it should be understood that the above-described embodiments are illustrative and not restrictive in all respects. The scope of the present disclosure is represented by the appended claims rather than the above detailed description, and all changes or modifications derived from the meaning and scope of the claims and equivalent concepts thereof should be construed as being included in the scope of the present disclosure.

INDUSTRIAL APPLICABILITY

The present disclosure provides the clamping apparatus for an antenna having the simpler structure and the smaller size by integrating components for rotating the antenna in the vertical direction and horizontal direction into one.

The invention claimed is:

1. A clamping apparatus for an antenna comprising:

a tilting bracket connected to the antenna and configured to support the antenna;

a base bracket installed on a support pole and disposed to protrude toward the antenna;

an integrating housing to which the tilting bracket is coupled to be rotated in a vertical direction and coupled to the base bracket to be rotated in a horizontal direction;

a tilting driving unit configured to rotate the tilting bracket in the vertical direction; and a rotation driving unit configured to rotate the integrating housing in the horizontal direction, wherein the tilting driving unit and the rotation driving unit are disposed in the integrating housing, wherein the tilting driving unit includes:

a tilting motor;

a tilting reducer having an input shaft coupled to a rotation shaft of the tilting motor;

a tilting worm shaft coupled to an output shaft of the tilting reducer and having a tilting worm gear provided on an outer circumferential surface thereof; and a tilting rotation shaft having a tilting worm wheel gear engaged with the tilting worm gear provided on an outer circumferential surface thereof, disposed horizontally, and coupled to the tilting bracket.

2. The clamping apparatus for an antenna of claim 1, wherein the rotation shaft of the tilting motor is disposed horizontally, and the tilting worm shaft is disposed vertically.

3. The clamping apparatus for an antenna of claim 2, wherein the tilting bracket includes:

a tilting bracket body coupled to a rear surface of the antenna; and a tilting bracket wing formed to protrude rearward from each of both sides of the tilting bracket body and coupled to the tilting rotation shaft through tilting holes formed in both sides of the integrating housing.

4. The clamping apparatus for an antenna of claim 1, wherein the tilting driving unit is disposed above the rotation driving unit.

5. The clamping apparatus for an antenna of claim 4, wherein the integrating housing is disposed on an upper surface of the base bracket.

6. The clamping apparatus for an antenna of claim 1, further comprising a plurality of guide rollers rotatably installed on the base bracket, in contact with a lower surface of the integrating housing, and configured to guide a horizontal rotation of the integrating housing.

7. The clamping apparatus for an antenna of claim 6, wherein the base bracket has a plurality of roller insertion holes into which the plurality of guide rollers are respectively inserted formed therein, and the clamping apparatus for an antenna further includes a plurality of roller covers coupled to the base bracket and having a roller protrusion hole through which bodies of the plurality of guide rollers respectively inserted into the plurality of roller insertion holes protrude upward formed therein.

8. The clamping apparatus for an antenna of claim 1, wherein the tilting driving unit is disposed in front of the rotation driving unit.

9. The clamping apparatus for an antenna of claim 8, wherein a rear portion of the integrating housing is disposed on an upper surface of the base bracket, and a front portion of the integrating housing is disposed to protrude forward more than the base bracket.

10. The clamping apparatus for an antenna of claim 1, further comprising a plurality of balls rotatably installed on a lower surface of the integrating housing, in contact with an upper surface of the base bracket, and configured to guide a horizontal rotation of the integrating housing.

11. The clamping apparatus for an antenna of claim 10, wherein a ring-shaped ball insertion groove into which the plurality of balls are inserted is formed in the lower surface of the integrating housing, and the clamping apparatus for an antenna further includes a ball cover coupled to the lower surface of the integrating housing and having at least one ball protrusion hole through which the plurality of balls inserted into the ball insertion groove protrude downward formed therein.

12. A clamping apparatus for an antenna comprising:

a tilting bracket connected to the antenna and configured to support the antenna;

a base bracket installed on a support pole and disposed to protrude toward the antenna;

an integrating housing to which the tilting bracket is coupled to be rotated in a vertical direction and coupled to the base bracket to be rotated in a horizontal direction;

a tilting driving unit configured to rotate the tilting bracket in the vertical direction; and a rotation driving unit configured to rotate the integrating housing in the horizontal direction, wherein the tilting driving unit and the rotation driving unit are disposed in the integrating housing, wherein the rotation driving unit includes:

a rotation motor;

a rotation reducer having an input shaft coupled to a rotation shaft of the rotation motor;

a rotation worm shaft coupled to an output shaft of the rotation reducer and having a rotation worm gear provided on an outer circumferential surface thereof; and a rotation shaft having a rotation worm wheel gear engaged with the rotation worm gear provided on an outer circumferential surface thereof, disposed vertically, and coupled to the integrating housing.

13. The clamping apparatus for an antenna of claim 12, wherein the rotation shaft of the rotation motor is disposed vertically, and the rotation worm shaft is disposed horizontally.

14. The clamping apparatus for an antenna of claim 13, further comprising an installation bracket installed on the support pole and having an upper surface formed horizontally, wherein the base bracket is coupled to the installation bracket and disposed on the upper surface of the installation bracket.

15. The clamping apparatus for an antenna of claim 14, wherein the rotation driving unit further includes a rotation fixing shaft having the rotation shaft rotatably installed on an outer circumference thereof and disposed vertically, and the clamping apparatus for an antenna further includes a center protrusion formed to protrude upward from a center of an upper surface of the base bracket, inserted into a rotation hole formed in a lower surface of the integrating housing, and coupled to the rotation fixing shaft.

16. The clamping apparatus for an antenna of claim 15, wherein a hole through which a direction control cable configured to control the tilting driving unit and the rotation driving unit passes is formed in the installation bracket and the center protrusion.

17. The clamping apparatus for an antenna of claim 16, wherein a connector is provided on one end of the direction control cable configured to control the tilting driving unit and the rotation driving unit, and a socket to which the connector is connected is provided on an outer circumferential surface of the integrating housing.

18. The clamping apparatus for an antenna of claim 14, further comprising a center protrusion installed on the base bracket to be rotated in the horizontal direction, disposed to protrude upward from a center of an upper surface of the base bracket, inserted into a rotation hole formed in a lower surface of the integrating housing, and coupled to the rotation shaft.

19. A clamping apparatus for an antenna comprising:

a tilting bracket connected to the antenna and configured to support the antenna;

a base bracket installed on a support pole and disposed to protrude toward the antenna;

an integrating housing to which the tilting bracket is coupled to be rotated in a vertical direction and coupled to the base bracket to be rotated in a horizontal direction;

a tilting driving unit configured to rotate the tilting bracket in the vertical direction; and a rotation driving unit configured to rotate the integrating housing in the horizontal direction, wherein the tilting driving unit and the rotation driving unit are disposed in the integrating housing, wherein an arc-shaped guide hole extending vertically is formed in the base bracket, and the clamping apparatus for an antenna further includes a ball guider coupled to a lower surface of the integrating housing through the guide hole, disposed under the base bracket, and having a plurality of rotatable balls in contact with a lower surface of the base bracket disposed to protrude from an upper surface thereof.

* * * * *